United States Patent
Snir et al.

(10) Patent No.: US 12,481,600 B2
(45) Date of Patent: Nov. 25, 2025

(54) MEMORY ASSISTED INCLINE ENCRYPTION/DECRYPTION

(71) Applicant: Intel Corporation, Santa Clara, CA (US)

(72) Inventors: Avishay Snir, Regba (IL); Ziv Chai, Even Shemuel (IL); Siddhartha Chhabra, Portland, OR (US); Prashant Dewan, Portland, OR (US); Baiju Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 17/485,370

(22) Filed: Sep. 25, 2021

(65) Prior Publication Data

US 2023/0094171 A1 Mar. 30, 2023

(51) Int. Cl.
*G06F 12/14* (2006.01)
*G06F 12/02* (2006.01)
*G06F 12/0882* (2016.01)

(52) U.S. Cl.
CPC ...... *G06F 12/1408* (2013.01); *G06F 12/0238* (2013.01); *G06F 12/0882* (2013.01); *G06F 12/1425* (2013.01); *G06F 12/145* (2013.01)

(58) Field of Classification Search
CPC ............ G06F 12/1408; G06F 12/0238; G06F 12/0882; G06F 12/1425; G06F 12/145
See application file for complete search history.

(56) References Cited

U.S. PATENT DOCUMENTS

| | | | | |
|---|---|---|---|---|
| 8,407,449 B1* | 3/2013 | Colon | ................ | G06F 12/0246 711/159 |
| 10,482,031 B1* | 11/2019 | Lurie | ................ | G06F 12/1027 |
| 2009/0276601 A1* | 11/2009 | Kancherla | ............ | G06F 12/04 711/170 |
| 2015/0169472 A1* | 6/2015 | Yap | .................. | G06F 12/1408 713/190 |

(Continued)

OTHER PUBLICATIONS

Extended European Search Report and search Opinion for Application No. 22185086.0, Jan. 5, 2023, 08 pages.

*Primary Examiner* — William R Korzuch
*Assistant Examiner* — Aditya Sriram
(74) *Attorney, Agent, or Firm* — Nicholson De Vos Webster & Elliott LLP

(57) ABSTRACT

Techniques for memory assisted inline encryption/decryption are described. An example includes an encryption data structure engine to provide a key, data, and a tweak to the encryption/decryption engine, wherein the encryption data structure engine is to: read an index value from an encryption data structure lookup data structure entry using an address, the entry to include the index value and a guest page physical address (GPPA), retrieve, based on the index value, an entry from the encryption data structure, the entry to include a logical block address (LBA) base, a key identifier, and at least one GPPA in a sequence of GPPAs, generate a LBA using a position of the GPPA from the encryption data structure lookup data structure entry in the sequence of GPPAs, and retrieve a key based on the key identifier, wherein the encryption engine to encrypt data using the retrieved key, and the generated LBA.

17 Claims, 20 Drawing Sheets

(56) References Cited

U.S. PATENT DOCUMENTS

| | | | |
|---|---|---|---|
| 2015/0248357 A1* | 9/2015 | Kaplan | G06F 12/1408 |
| | | | 713/193 |
| 2015/0261965 A1 | 9/2015 | Brumley et al. | |
| 2019/0042402 A1* | 2/2019 | Chhabra | G06F 9/45558 |
| 2019/0095350 A1 | 3/2019 | Durham et al. | |
| 2019/0362081 A1* | 11/2019 | Kanno | G06F 3/0679 |
| 2021/0117340 A1* | 4/2021 | Trikalinou | H04L 9/0637 |

\* cited by examiner

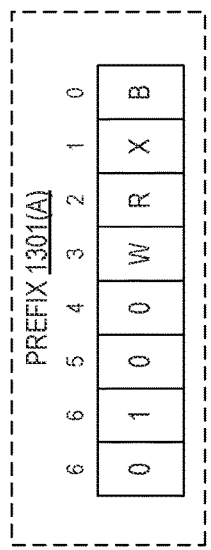
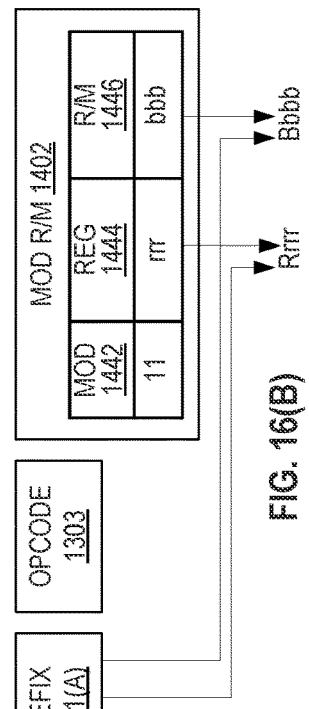
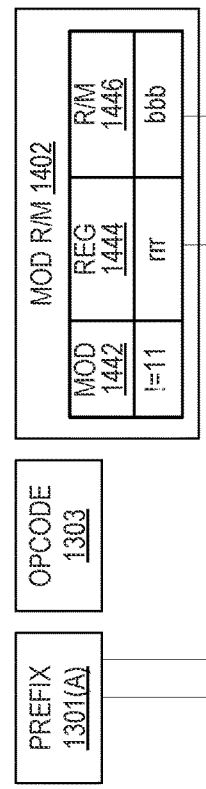
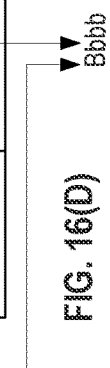
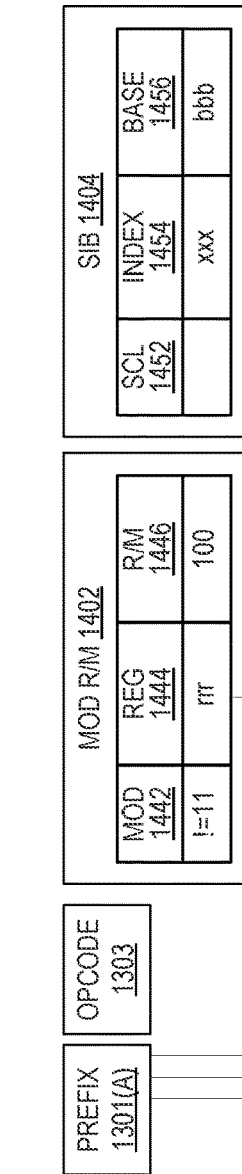

MEMORY ASSISTED INCLINE ENCRYPTION/DECRYPTION

BACKGROUND

Non-Volatile Memory express (NVMe) devices store data at rest (i.e., persistently) and this data has to be encrypted for security. To perform encryption in the System on Chip ("SOC"), the cryptographic (also referred to herein as "crypto" interchangeably) controller responsible for encryption in the SOC needs multiple pieces of information regarding the NVMe device including the LBA (Logical Block Address) of the NVMe device where the data is being stored. While some embodiments herein are discussed with reference to an NVMe, embodiments are not limited to NVMe and other types of non-volatile memory may be used.

BRIEF DESCRIPTION OF DRAWINGS

Various embodiments in accordance with the present disclosure will be described with reference to the drawings, in which:

FIG. 15 illustrates embodiments of a first prefix.

FIGS. 16(A)-(D) illustrate embodiments of how the R, X, and B fields of the first prefix 1301(A) are used.

DETAILED DESCRIPTION

The present disclosure relates to methods, apparatus, systems, and non-transitory computer-readable storage media for memory assisted encryption/decryption.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

In various implementations, the information regarding the NVMe device may not be communicated to the host (or interchangeably referred to herein as "host driver") or the crypto controller in the DMA (Direct Memory Access) path. In other words, when the drive performs a DMA operation, it may not send this information to the host. Most NVMe drives used in personal computers have to use the PCIe (Peripheral Component Interface express (e.g., as maintained and developed by the PCI-SIG (PCI Special Interest Group)) protocol), and the PCIe protocol headers do not provide any easy mechanism for the drive to send additional information. This makes the problem of inline encryption using NVMe drives very tricky. As discussed herein, inline encryption implies that the encryption and decryption are happening when the data is being read/written from the drive to DRAM or vice-versa. This is in contrast to lookaside encryption, where the NVMe controller writes data to memory and then some other agent reads plaintext data from memory, encrypts it and writes it back to memory or reads ciphertext from memory, decrypts it and writes plaintext to memory. As a result, the drive may not provide the information for encryption.

In some prior implementations, software has to maintain a table of transactions and logical block address (LBAs) to generate tweaks for the incoming transactions in real time. To reduce the memory latency, the tweak inputs are stored in local SRAM (local to the processing engine inside the silicon). Although it works for small number of pending DMA transactions, it quickly becomes challenging as the number of pending DMA transactions increase. Use of SRAM is not scalable and as the volume of SRAM needed increases, the cost of the solution increases.

Figure 1:
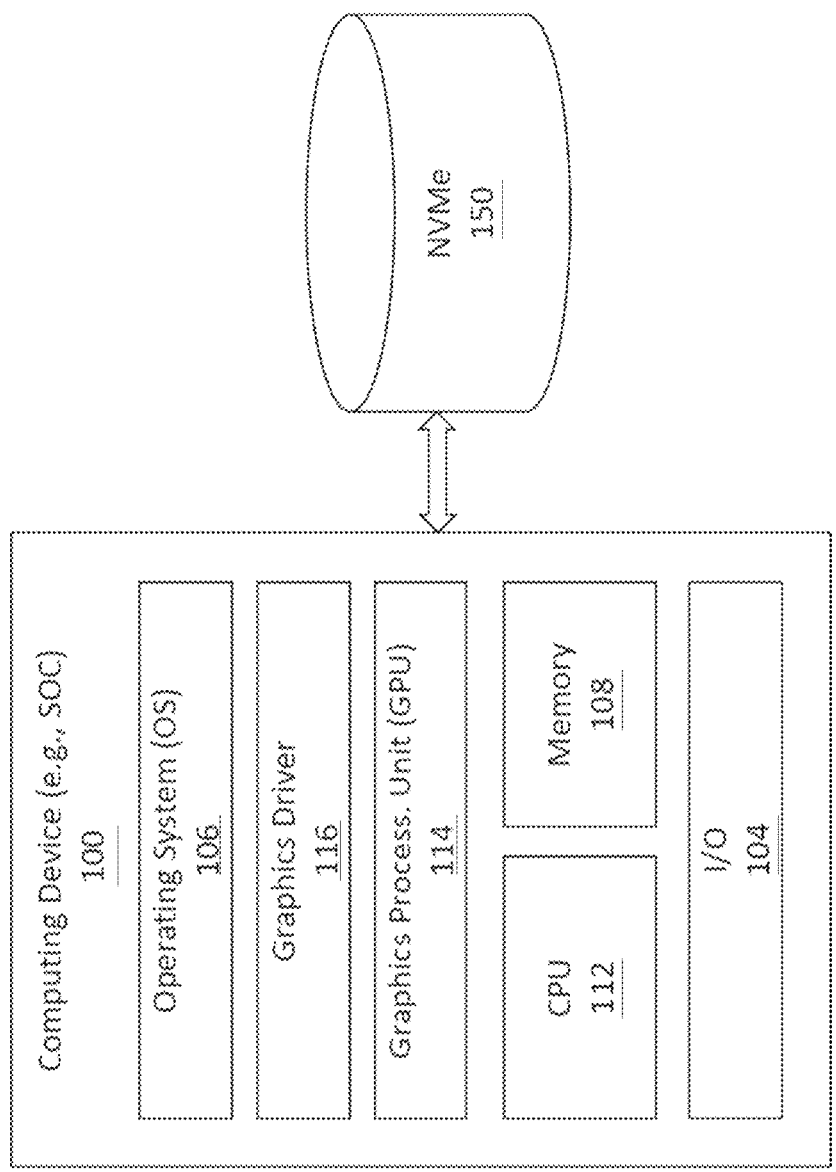
FIG. 1 schematically illustrates an exemplary embodiment of a computing device for implementing a disclosed embodiment.

FIG. 1 schematically illustrates an exemplary embodiment of a computing device for implementing a disclosed embodiment. In FIG. 1, computing device 100 comprises a computer platform hosting an integrated circuit ("IC"), such as a SOC, integrating various hardware and/or software components of computing device 100 on a single chip. As illustrated, in one or more examples, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user. SOC 100 may optionally communicate with NVM 150. Non-volatile memory 150 may be accessed using non-volatile memory express which is the protocol for accessing high-speed storage media. NVMe is used herein to reference both the non-volatile memory (e.g., SSD) and its communication protocol.

It should be noted that FIG. 1 illustrates an exemplary embodiment and additional components may be included without departing from the disclosed principles. For example, embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware. Additional embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
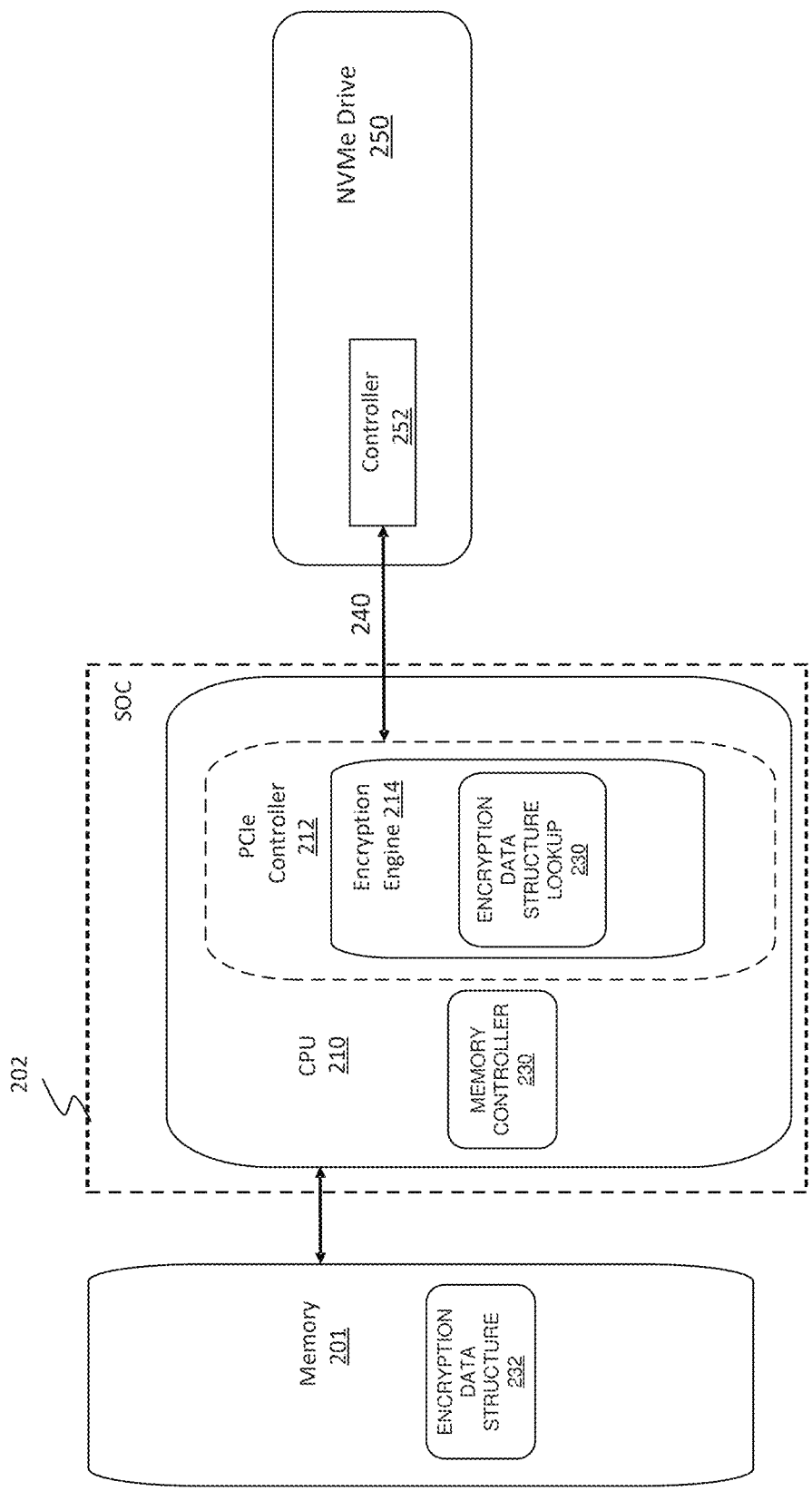
FIG. 2 schematically illustrates an exemplary system topology according to an example of the disclosure.

FIG. 2 schematically illustrates an exemplary system topology according to an example of the disclosure. CPU 210 of FIG. 2 includes, in some examples, a PCIe controller 212. In some examples, the PCIe controller 212 includes a encryption engine 214, but that is not true of all embodiments. PCIe controller 212 conventionally defines an interface standard for connecting high-speed components such as NVMe. As shown, PCIe controller 212 includes encryption engine 214 for encrypting/decrypting inbound and outbound communications. CPU 210 communicates with peripheral component (i.e., NVMe drive 250) through PCIe controller 212. NVMe controller 252 acts as the portal to NVMe driver and may include additional components (not shown) to encrypt/decrypt the inbound/outbound communications. Communications between CPU 210 and NVMe 250 are considered inline communications.

Inline encryption for NVMe drives raises a challenge which is unique to the NVMe drivers. In the exemplary embodiment of FIG. 2, the challenge is that NVMe drive 250 includes NVMe controller 252 in the driver itself. As a result, inline encryption engine 214 in the SOC 202 lacks the required metadata to decide which of the packets must be encrypted/decrypted and the key/tweak material required for their encryption.

Conventional storage device encryption methodologies include AES-XTS standards which use a tweak. In such methodologies, the tweak is generated using Logical Block Address (LBA) and the challenge is that the host does not receive the block address from the drive in the direct memory access (DMA) path. The LBA is managed by the drive internally. A second challenge is that the commands that go to the drive cannot be encrypted since they must be parsed and executed by the drive. As a result, the inline encryption in SOC (i.e., encryption engine 214) needs a mechanism to parse the packets and figure out which ones are data packets and which ones are command packages.

As will be discussed in detail later, the memory 201 is to store an encryption data structure 232 which is indexed by the encryption data structure lookup data structure 230. The encryption data structure 232 is to store information used in the generation of a LBA to be used as a tweak for AES-XTS.

Figure 3A:
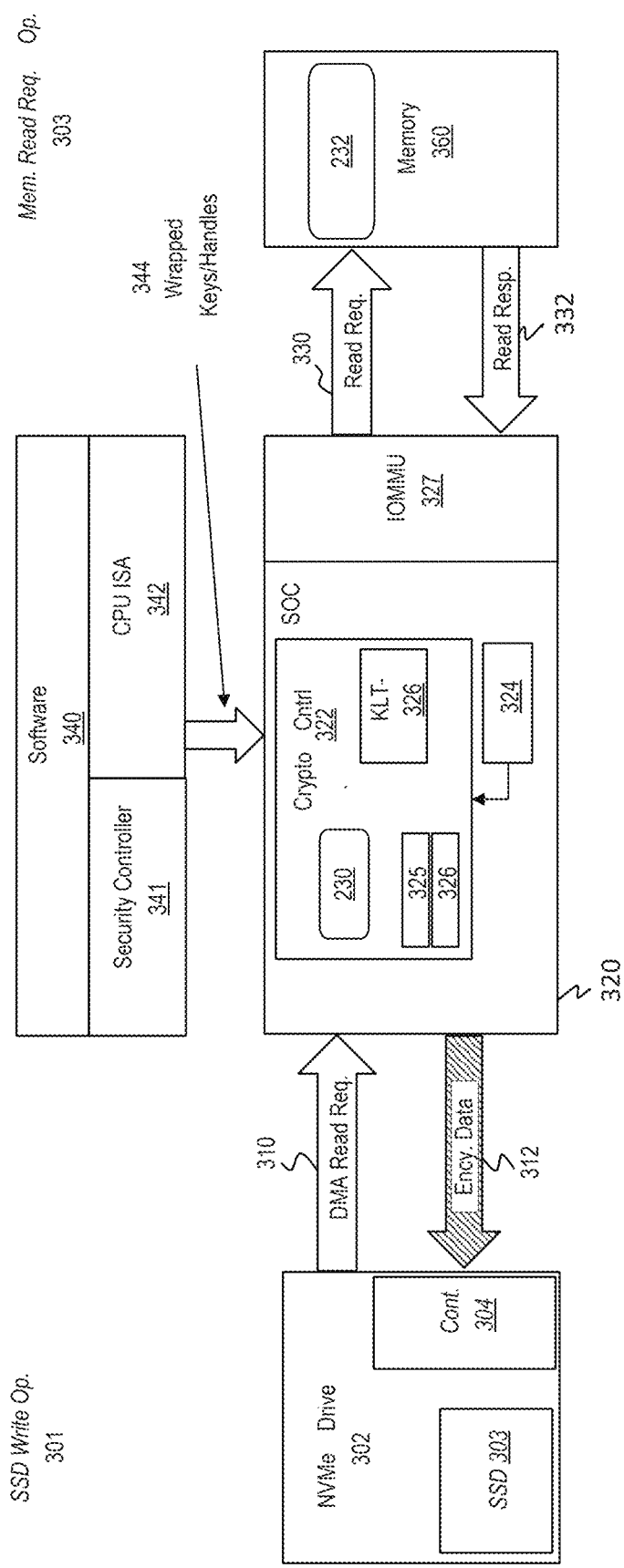
FIGS. 3A and 3B illustrate one or more system architectures for memory access at line speeds according to embodiments of the disclosure.
Figure 3B:
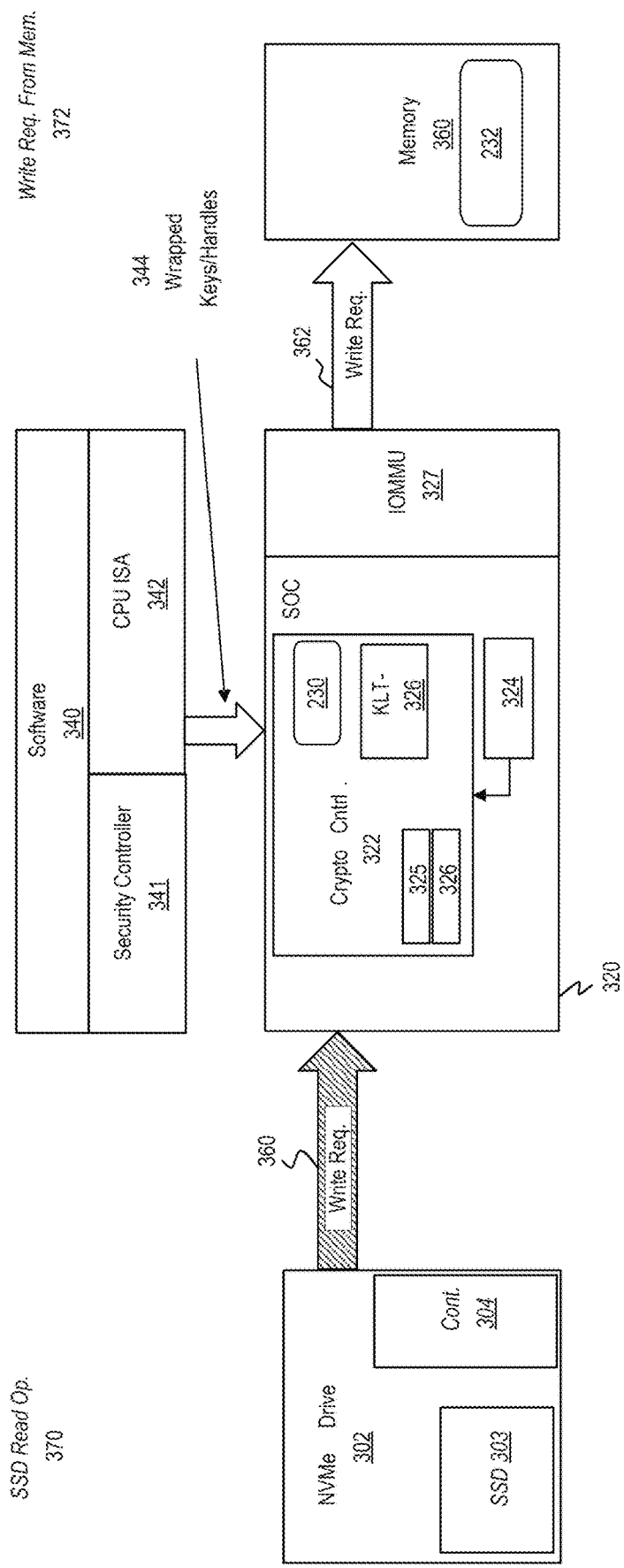

The encryption and decryption of data is implemented inside the SOC. FIGS. 3A and 3B illustrate system architecture for memory access at line speeds according to embodiments of the disclosure.

Specifically, FIG. 3A illustrates a system architecture for a memory read process at line speed as used to read from memory 360 and write to device 302. Referring to FIG. 3A, NVMe drive 302 may correspond to NVMe drive 150 or 250 in FIGS. 1 and 2. In one example, the NVMe drive 302 comprises a solid state drive (SSD) which is transacting a write operation 301 on memory 360 as denoted by memory read operation 393. Memory 360 may correspond to memory 108 or 201 in FIGS. 1 and 2. Memory 360 may for example comprise a Dynamic Random Access Memory (DRAM).

Conventional SSDs read and write data to a substrate of interconnected flash memory chips which are fabricated in silicon. NVMe SSDs have been gaining popularity due to their speed. NVMe SSDs use NVMe Host Controller Host Controller interface Specification (NVMHCIS) (not shown) for accessing non-volatile storage media attached via PCIe bus network (not shown).

Referring again to FIG. 3A, NVMe drive 302 may require direct memory access (DMA) to memory 360 in order to obtain data. To this end, NVMe drive 302 issues DMA Read Request 310 to SOC 320. The SOC 320 may correspond to computing device/SOC 100 or SOC 202 in FIGS. 1 and 2. The DMA Read Request 310 need not be encrypted.

SOC 320 is interposed between NVMe drive 302 and memory 360. Memory 360 may comprise a Dynamic Random Access Memory (DRAM). SOC 320 is shown with Cryptographic Controller (Crypto Controller) 322, hardware key engine 324 and Input/Output Memory Management Unit (IOMMU) 328. Hardware key engine receives its keys from the CPU ISA 340 (as programmed by software) or from a security controller.

Crypto Controller 322 may comprise one or more processor circuitries and components. In one or more examples, Crypto Controller 322 is implemented in a PCIe controller 212 of the SOC 320. For example, the Crypto Controller 322 could implement or be part of the encryption engine 214 shown in FIG. 2. In one or more examples, Crypto Controller 322 comprises encryption/decryption engine 325 configured to encrypt or decrypt data according to instructions stored at the crypto memory circuitry and/or lookup tables. Crypto Controller 322 may optionally also comprise Key Lookup Table (KLT) 326. KLT 326 is a memory circuitry used to store various lookup tables as further described below.

Crypto Controller 322 may optionally include memory which may comprise one or more Static Random Access Memory (SRAM) circuitries in communication with processor circuitries of Crypto Controller 322. Memory circuitry 327 may store one or more instructions to cause the one or more processor circuitries (not shown) in Crypto Controller 322 to execute a plurality of desired tasks. The tasks include, for example, receipt and storing of cryptographic information required to encrypt or decrypt data, forming data and/or key tables and communicating encrypted or decrypted data with components external to the SOC 320. Once formed, such tables may be stored at Key Lookup Table (KLT) 326, encryption data structure 232, and/or encryption data structure lookup data structure 230.

For simplicity, the following exemplary embodiments reference Crypto Controller 322 generically to include encryption/decryption engine 325 and Memory 327, where applicable.

Crypto controller 322 also includes Input/Output Memory Management Unit (IOMMU) 328 which connects a DMA-capable I/O bus to external Memory 360. In one or more examples, the IOMMU will be inside the SOC 320 but not inside the crypto controller 322. The crypto controller will be between the IOMMU and the memory 360.

Software 340 interfaces SOC 320 via CPU Instruction Set Architecture (ISA) 342. ISA 342 acts as an interface between Software 340 and SOC 320. In one or more examples, Software 340 supports multiple encryption keys. Software 340 may program the Keys. There may be four types of keys: (1) hardware generated, (2) hardware wrapped, (3) plaintext keys, and (4) no-encryption "key". Security controller 341 is shown as part of Software 340 to comprise one or more processors (circuitry or logical) to implement functions ascribed to Software 340.

In another embodiment, Software 340 may utilize Key Wrap construction 344. The Key Wrap constructions are a class of symmetric encryption algorithms designed to encapsulate (encrypt) cryptographic key material. The Key Wrap algorithm is intended to protect keys while stored in an untrusted storage or when the keys are transmitted over untrusted communications networks. Here, the Key Wrap/Handle construction may be optionally used as the communication is external to SOC 320.

During an exemplary implementation NVMe driver (e.g., SSD) 302 transmits a read request 310 to SOC 320. Read Request 310 may not be encrypted. In an optional embodiment, a portion of the Read Request 310 may be encrypted. Read Request 310 contains an encryption data structure lookup data structure 230 index which allows the Crypto Controller 322 (such as encryption engine 214) to identify one or more encryption of the requested data using encryption data structure 232. When using a PCIe link between the NVMe drive 302 and the SOC 320, the Read Request 310 may adhere to the PCIe transaction layer packet (TLP) format for a read request, where the TLP header may be used to in the generation of a LBA tweak using 230 and 232, so as to facilitate the encryption of the requested data by the Crypto Controller 322. If Read Request 310 is not encrypted, Crypto Controller 322 is not engaged and SOC 320 relays Read Request 330 to Memory 360 via IOMMU 328. Responsive to the request, Memory 360 transmits Read Response 332 to SOC 320 via IOMMU 328.

Crypto Controller 322 receives the requested data in Read Response 332 and encrypts the requested data according to the disclosed embodiments. In certain embodiment, the response includes one or more data packets. A data packet generally may include a header portion and a payload portion. The payload portion of the packet includes data which may be encrypted. The requested data is encrypted using the encryption keys. The encryption keys may be provided by Software 340. As stated, SOC's communication with the endpoints may be governed by the PCIe protocol which allows, for example, PCIe endpoints to attach up to four 32-bit headers to the TLP packets as described according to an example herein. A PCIe endpoint has the choice of sending any additional data in these headers. The header may be added by NVMe controller 304.

In another embodiment, some of the address bits in the header of Read Request 310 (and Write Request 370 described herein below) may be used to indicate the index. In the PCIe context, the address bits may be comprised in the TLP header. The Read Request 310 and Write Request 370 may be DMA requests that can have 64 bits of address information. The address information can be one of the following three information: physical address, Guest Physical Address, or IO Virtual Address. A number of the available address bits may be used to index a table of 4K entries with 8 bytes per entry (i.e., 32 K byte table).

The Crypto Controller 322 parses and removes this header information and uses the index to look up an entry in the encryption data structure lookup data structure 230 and uses information from that lookup to calculate the actual LBA from the base LBA using the encryption data structure 232.

In one or more examples, Crypto Controller 322 selects requested data read from memory 360 for encryption. In an example implementation, this selection is based on a BUS DEVICE FUNCTION (BDF) that is used to identify one or more NVMe drives. Software 340 (which may include one or more of an operating system (OS), a software application, host driver, etc.) may provide the BDF of the NVMe drive 302 using a software interface to Crypto Controller 322 (not shown). Data read from memory 360 for storage on the NVMe drive 302 is encrypted by the Crypto Controller 322 before passing the read data to the NVMe drive. Encrypted data emanating from the NVMe drive 302 is decrypted by the Crypto Controller 322 before passing it to another device, e.g., to memory 360. Data emanating from other devices may not be encrypted/decrypted by the crypto controller in some embodiments.

The requested read data refers to the data that is requested by the host (e.g., software 340) using the command stream. The command stream is composed by the software 340 and is sent to NVMe drive 302 and then the NVMe drive 302 sends it back in the TLP Prefix (during the DMA session) provided in Read Response 332. The SOC 320 reads the data from the memory, the crypto controller encrypts the data and the encrypted data 312 is communicated to NVMe drive 302. NVMe Controller 304 receives and stores the encrypted data in the SSD flash memory 303. The encrypted data 312 is then written to the NVMe drive 302 as indicated by SSD write operation 301. Because encryption is done at SOC 320, the entire encryption operation is done at inline DMA speed and no delay is introduced due to components external to the SOC 320.

FIG. 3B illustrates a system architecture for a memory write process at line speed. I FIG. 3B, NVMe Drive 302 is intending to write data into memory 360. The process begins with NVMe Drive 302 issuing Write Request 370. Write Request 370 may comprise encrypted data as illustrated by the hatching of arrow 370. Thus, in one or more examples where the data stored in the NVMe 302 is to already encrypted, NVMe Controller 304 may encrypt the payload data to be transmitted in Write Request 370.

SOC 320 receives encrypted Write Request 370 from NVMe Controller 304. Write Request 370 includes encrypted data from the SSD flash memory 303 of the NVMe drive 302. To facilitate decryption of the data at the Crypto Controller 322, the Write Request 370 includes key table index and optionally further an offset to the LBA. As described before in connection with the Read Request 310, when using a PCIe link between the NVMe drive 302 and the SOC 320, the Write Request 370 may adhere to the PCIe TLP format for a write request, where the TLP header may be used to indicate a key table index and the offset to the LBA. Crypto Controller 322 decrypts the encrypted data from Write Request 370 using one or more of key information from Software 340, a Key lookup table from KLT 326, encryption data structure 232, encryption data structure lookup data structure 230, and hardcoded cypher keys from Hardware Key Engine 324. The decrypted data of Write Request 370 is then transmitted to Memory 360 as illustrated by arrow 372. Memory 360 then writes data to allocated memory slots. In one or more examples, the address indicating the memory location in memory 360 for writing the data can be indicated in the header of the Write Request 370. In this example, the Key Engine 324 is indicated in FIGS. 3A and 3B is part of the SOC 320. The Key Engine 324 may be implemented within the Crypto Controller 322.

Figure 4B:
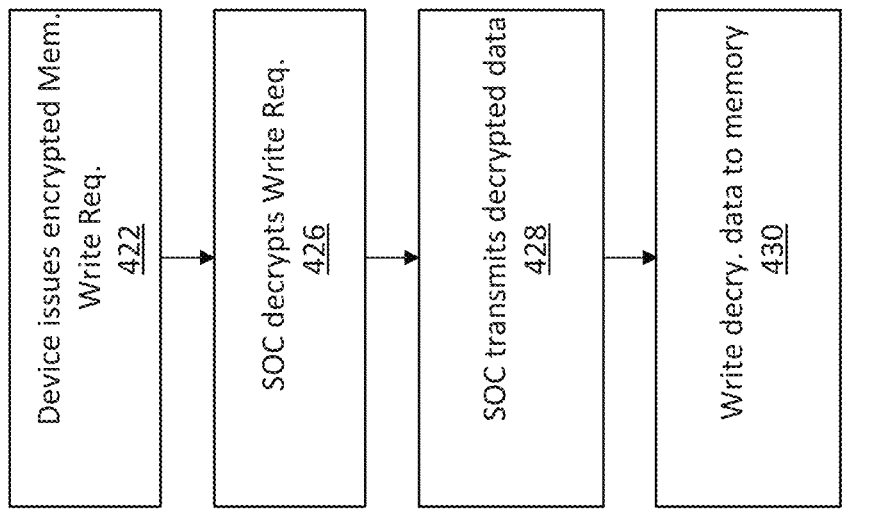
FIG. 4B shows an exemplary inline decryption process for writing data onto a memory module external to the NVMe.
Figure 4A:
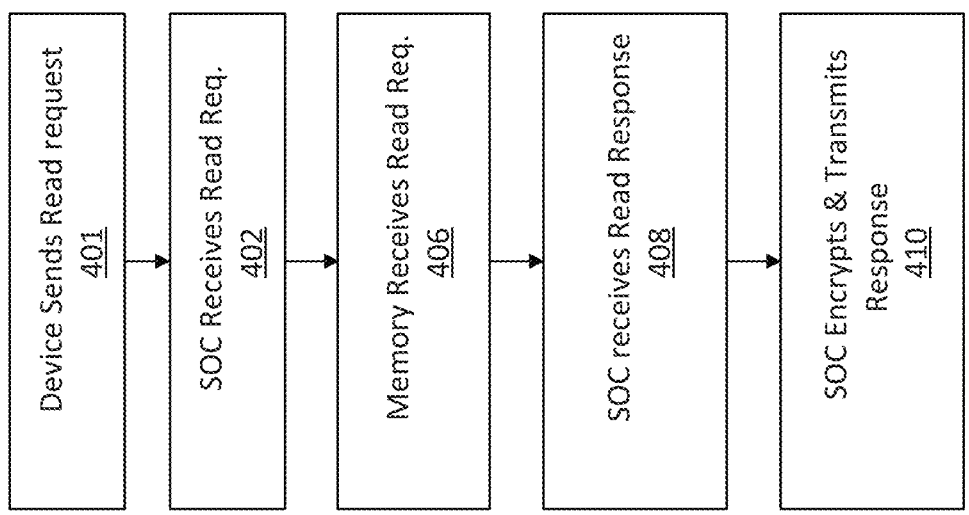
FIG. 4A shows an exemplary inline encryption for writing data onto an NVMe SSD.

FIG. 4A shows an exemplary inline encryption for writing data onto an NVMe SSD. As described in relation to FIG. 3A, NVMe (SSD) issues a Read Request 310. This is shown as operation 401 in FIG. 4A. The Read Request 310 is a DMA request transmitted from the NVME drive 302 (e.g., controller 304) to SOC 302. At operation 402, the SOC 320 receives the Read Request 310 and transmits a Read Request 330 to the external memory 360 to request the data to be read from the memory 360. At operation 406, the external memory 360 responds to the Read Request 330 with a Read Response 332 containing the requested data. At operation 408, the Read Response 332 including the data (unencrypted) is received at the SOC 320. At operation 410, SOC's Crypto Controller 322 (not shown) encrypts the data using hardware keys, key index and other cryptographic key information before transmitting the encrypted data 312 to the NVMe drive 302. The Read Request 310 may comprise encryption information, including a key table index and optionally an offset of the LBA in order to enable the SOC's Crypto Controller 322 selecting the encryption key(s) and optionally the encryption parameters for encryption of the requested data from memory 360. It should be noted that neither SOC 320 nor NVMe drive 302 may decrypt the data that is to be stored in flash memory of the NVMe drive 302; rather, the data is stored as encrypted data.

FIG. 4B shows an exemplary inline decryption process for writing data onto a memory module external to the NVMe. As described in relation to FIG. 3B, at operation 422, NVMe (SSD) issues a Write Request 370 to the SOC. In one or more examples, the Write Request 370, which may contain encrypted data, is encrypted by the NVMe Controller (304, FIG. 3B). The Write Request 370 is transmitted to the SOC 320. At operation 426, the SOC 320 decrypts the encrypted data in the Write Request 370 at the Crypto Controller 322 of the SOC 320. The decrypted data from Write Request 370 is then transmitted to the memory in Write Request 372 as indicated in Operation 428. At operation 430, the memory 360 receives and writes the decrypted data into the appropriate memory slots.

Figure 5:
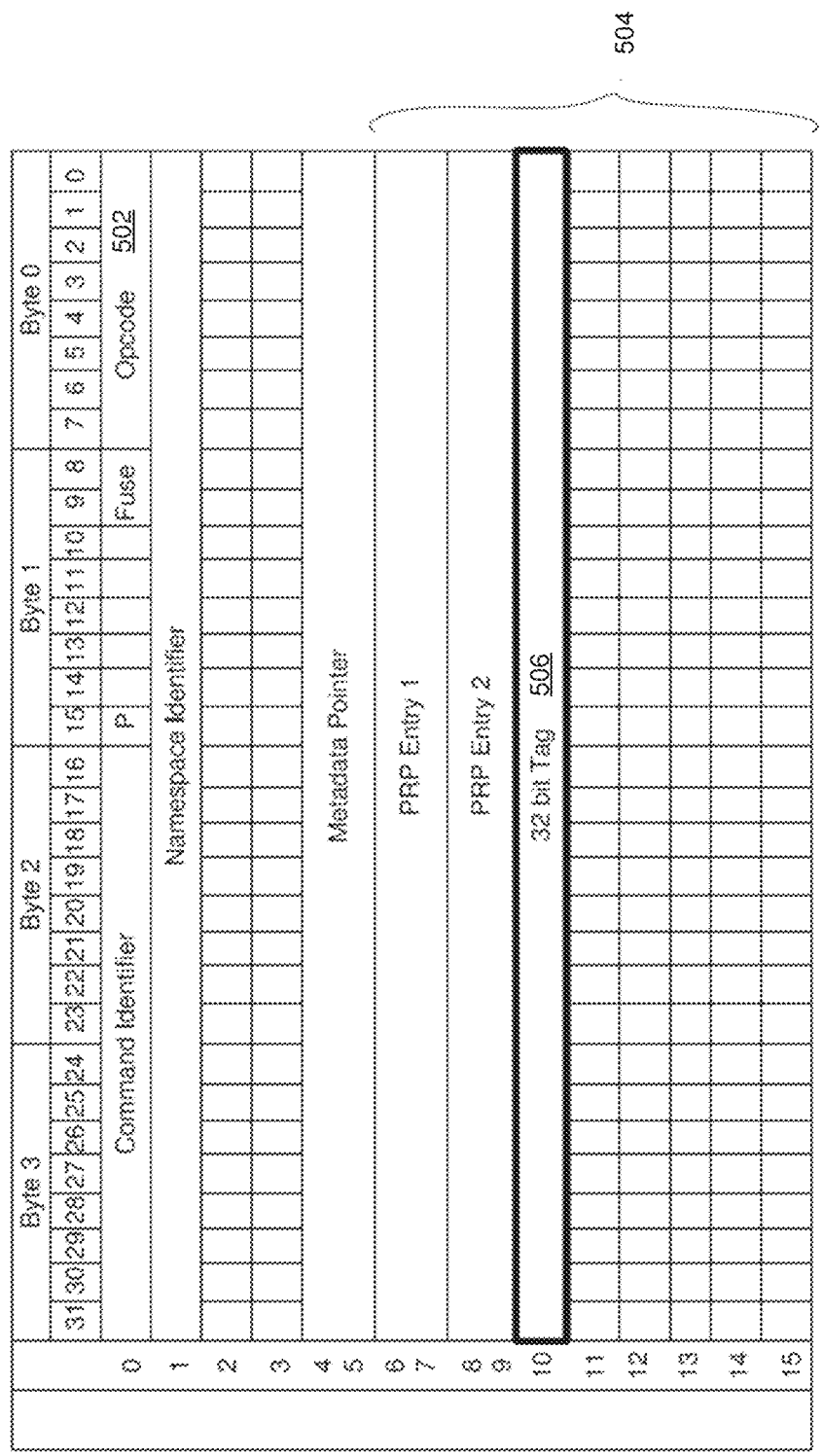
FIG. 5 illustrates a key lookup table according to one or more examples of the disclosure in which a single Key Id is used.

FIG. 5 illustrates a key lookup table according to one or more examples of the disclosure in which a single Key Id is used. In FIG. 5, NVMe drive 510 is shown with an NVMe Controller 512. As discussed in reference to FIGS. 3A and 3B, Crypto Controller 530 may correspond to Crypto Controller 322 which encrypts/decrypts transactional data. The PCIe Interface 520 represents the interface between the Crypto Controller 530 and the NVMe drive 510. Crypto Controller 530 in FIG. 5 may for example use the encryption standard AES-XTS-256 for encryption and decryption of data. As illustrated by arrow 515, address data 540 indicative of the physical address for DMA (64 bit) read or write access to memory 360 is initiated by NVMe drive 515. In one or more examples, address data 540 includes key lookup index 542, LBA offset 544 and the physical address 546 of the data to be read or written. The address data 540 is comprised in the read request or write request provided to the SOC comprising the crypto controller 530 via the PCIe interface 520. Address data 540 is used by the crypto controller 530 (also 322, FIG. 3A, 3B) to retrieve additional information for encrypting/decrypting the data. The KLT 550 may be stored at SOC 320 (see, KLT 326 in FIG. 3A, 3B). The key lookup index 542 in the data 540 may be used by the crypto controller 530 (also 322, FIG. 3A, 3B) to retrieve KeyID, LBA and file information data (used to encrypt data) from the KLT 550. Key ID of KLT 550 may provide the key(s) for encryption/decryption of data (see Key table 560). The file information data may provide additional information for generating a tweak for the encryption/decryption.

As discussed, an exemplary inline crypto engine encrypts and decrypts the data on the DMA path of the NVMe drive. This encryption and decryption are implemented inside the SOC. In some embodiments, the encryption uses the AES-XTS256 standard. A unique attribute of AES-XTS256 is that it uses two 256-bit keys in which the first key is used for encryption or decryption using the AES rounds and the second key is used for generation of a tweak.

The tweak protects from known plaintext attacks where two pieces of plaintext encrypted using the same key will lead to the same ciphertext. To protect from such attacks, a tweak is conventionally used which is generated by encrypting a nonce with the second key. The generated tweak is subsequently used to XOR the plaintext and the ciphertext of the encryption such that even two plaintexts encrypted with the same key will lead to different cipher texts due to different tweaks.

As discussed above, inline encryption implies that the encryption and decryption are occurring when the data is being read/written from the drive to DRAM or vice-versa. This is in contrast to lookaside encryption, where the NVMe controller writes data to memory and then some other agent reads plaintext data from memory, encrypts it and writes it back to memory or reads ciphertext from memory, decrypts it and writes plaintext to memory. As a result, the drive may not provide the information for encryption.

To handle this problem, a table-based approach may be used and allow the host software to setup the table, which the crypto controller can then look up. This option is feasible, however due to the need for fast lookups, it is impractical for the crypto controller to search the table or parse through a hierarchical table. There is a need for an index into the table and that index needs to be mapped with a transaction. This leads to the problem of sending the index in the transaction. That problem can be solved using unused address bits. However, there is also a need to solve this problem without using the address bits for platforms that need all their address bits, especially in the data centers of the cloud service providers that need to use all the address bits for addressing large amounts of data.

In some embodiments, the PCIe end point has the choice of sending additional data in these headers, e.g., as discussed for example in connection with FIGS. 3A, 3B above. The PCIe header(s) can be used to send the index as detailed below. The crypto controller parses and removes this header information and uses index to look up a record/entry to calculate the actual LBA from the base LBA. This allows various embodiments to support indexes for 64K pending entries (using 16 bits) and offsets of 20 bits (i.e., 1M*4K) or 4 Gigabytes of pending input/output (I/O or IO) transactions in one or more examples. Depending on the implementation, the table/index size can be larger than this example.

Moreover, such embodiments can provide scalability since there is no need to reuse address bits. Also, there is no need to provide additional wires/pins in the system for increasing the address bits, which would keep implementation costs and the required footprint down. Hence, some embodiments provide more flexibility by allowing modifications to send more bits depending on the implementation.

To this end, some embodiments relate to techniques of enforcing inline encryption on NVMe drives using one or more PCIe extension(s). In an example, an index to a key table is provided to the NVMe drive from the host (e.g., host software 304) and the NVMe drive then communicates the key table index of the key to be used for encryption/decryption in a DMA (or other memory access like a PCIe) request along with an offset value, e.g., in the PCIe TLP (Transaction Layer Packet) prefix.

Generally, NVMe commands contain command codes and parameters. FIG. 5 shows sample information for a NVMe command associated with a read operation or a write operation, which may be used in one or more examples. The Opcode or Operational Code 502 indicates whether the command is a read or a write command, while the PRP (Physical Region Page) entries (or pages) 504 provide guest physical addresses to the actual data. As shown, 32 bits can be reserved in the NVMe command for a 32-bit tag (maximum in an example) that is sent by the software along with the command. Software 340 populates a 32-bit index (and any other information if needed) in the tag 506 and the rest of the command stays the same. While some embodiments herein are discussed with reference to a 32-bit tag, other size tags may also be used depending on system capabilities. In some embodiments, the NVMe command is a part of a PCIe Transaction Layer Packet (TLP) as data of a TLP.

Figure 6:
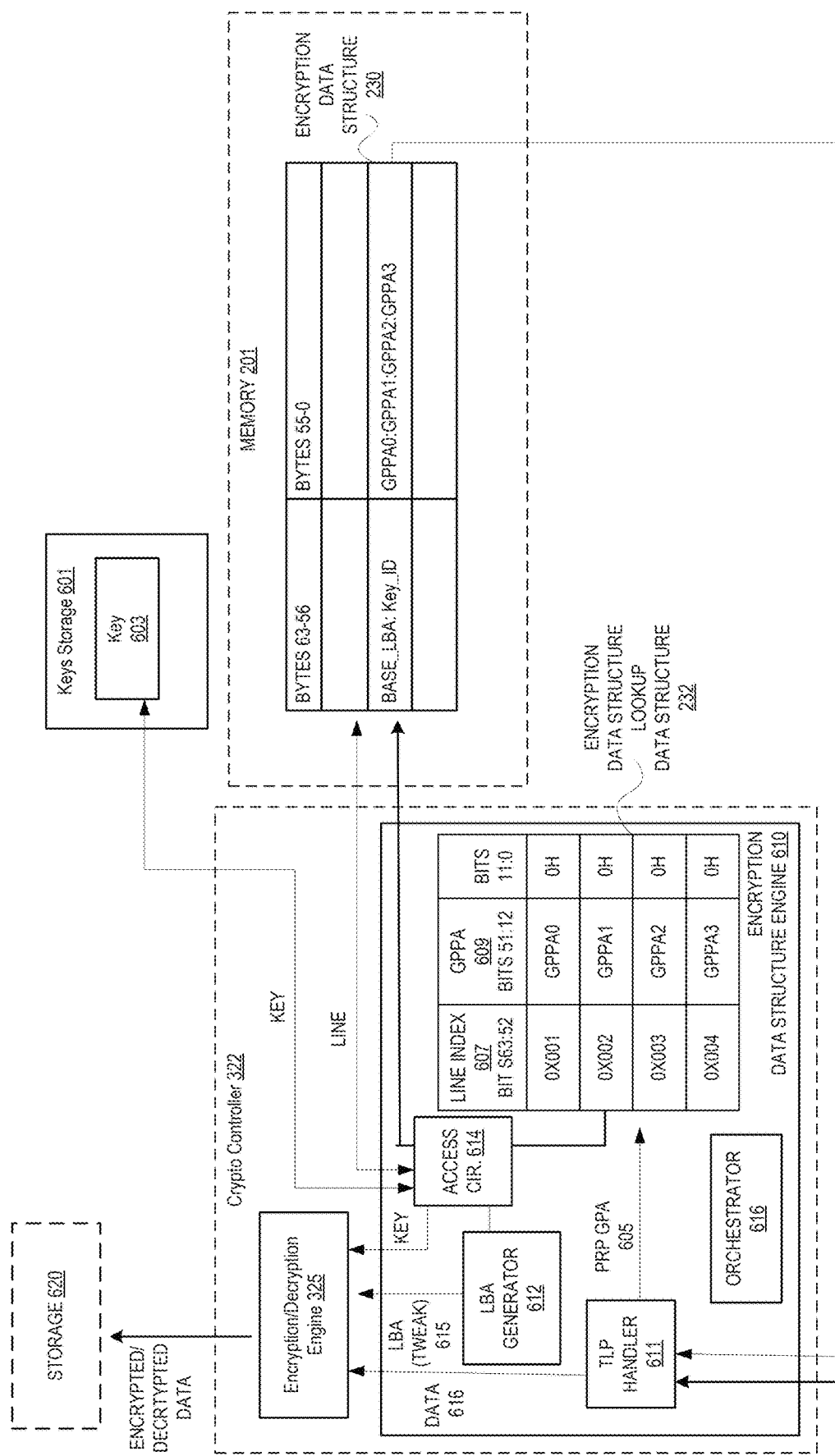
FIG. 6 illustrates embodiments of usage of an encryption data structure lookup data structure and an encryption data structure.

FIG. 6 illustrates embodiments of usage of an encryption data structure lookup data structure and an encryption data structure. In particular, this illustrates, in some embodiments, the encryption data structure lookup data structure 232 and encryption data structure 230.

The encryption data structure lookup data structure 232 includes one or more entries. Each entry includes a line index 607 (shown as bits 63:52), a Guest Page Physical Address (GPPA) 609 (shown as bits 51:12), and, in some instances, unused bits (shown as bits 11:0). The line index 607 provides a least part of a pointer to a particular entry in the encryption data structure 230.

The encryption data structure 230 stores, per entry, a base LBA, key ID, and one or more GPPAs. The key ID points to a key 603 in key storage 601. The key storage 601 may be on die, in sequestered memory, etc. Typically, the encryption data structure 230 is in sequester memory in memory 201 as is only readable by the crypto controller 322 and is writable by software. It can be configured this way either using range registers or an IOMMU. This memory is allocated by BIOS and written to by the OS.

Upon an encryption data structure engine 610, under the guidance of an orchestrator 616 (e.g., a firmware routine, finite state machine, etc.), receiving a TLP and/or NVMe command having a GPA 605, causes a TLP handler 611 to access the encryption data structure lookup data structure 232 by using index bits from the GPA 605. For example, a GPA provided by PRP Entry 1 of FIG. 5. An entry is indexed by higher order bits provided by the GPA 605. These GPA 605 bits are called index bits (INDEX_BITS) as they provide a line (or entry) index into the encryption data structure lookup data structure 232. Note that in this illustration bits 63:52 of the GPA 605 are INDEX_BITS.

The line index 607 is used to access a particular entry (line) in the encryption data structure 230 using access circuitry 614. In this example, the second entry is accessed based on the line index value. Note that the line in the encryption data structure lookup data structure 232 includes a GPPA value of GPPA1. That line is returned and includes base LBA, key ID, and GPPAs.

The key ID is used to access a key 603 in key storage 601. The position of GPPA1 in the line of the encryption data structure 230 and base LBA may be used in the generation of an LBA to be used as a tweak 615 by the encryption/decryption engine 325 to encrypt data 616 from the TLP 600 using accessed key. The encrypted data is then sent to storage 620.

In this illustration, there are 12 bits in the index space, leading to 4K entries in the encryption data structure lookup data structure 232. This can be extended to 24 bits (0-11) leading to 16M entries. Depending on the read granularity of the hardware the size of an entry (LINE_SIZE) in the encryption data structure 230 can be increased or decreased. Also, the size of the encryption data structure 230 can be increased by adding additional index bits (in addition to the indexes in the address or in lieu of the indexes in the address) in the TLP header. As a result, the size of the encryption data structure 230 is architecturally unlimited and is only limited by the amount of memory available in the system. For example, if an architecture supports 128B memory reads, the LINE_SIZE can increase to 128 bytes. 8 bytes are taken for the header that contains the KEY_IDs for identifying the key associated with the line and the remaining point to the BASE_LBA.

In some embodiments, one or more of the LINE_SIZE, the number of index bits, a BLOCK_SIZE, and the size of the encryption data structure lookup data structure 232 are configurable. For example, in some embodiments, a PCONFIG instruction is invoked by software for configuring platform features. PCONFIG supports multiple leaves, and a leaf function is invoked by setting the appropriate leaf value in one or more registers. A leaf will allow host software to configure these parameters. In addition, this leaf will only be accessible from ring 0 and will have a VMEXIT control. This will allow to VMM to configure for all the VMs if needed.

An advantage of this approach is that it does not depend on the expensive SRAM thereby allowing the solution to be scalable and lower the cost of implementation. In addition, this solution can scale to servers that have high pending DMA transfer requirements and IOT devices that have lower such requirements.

Figure 7:
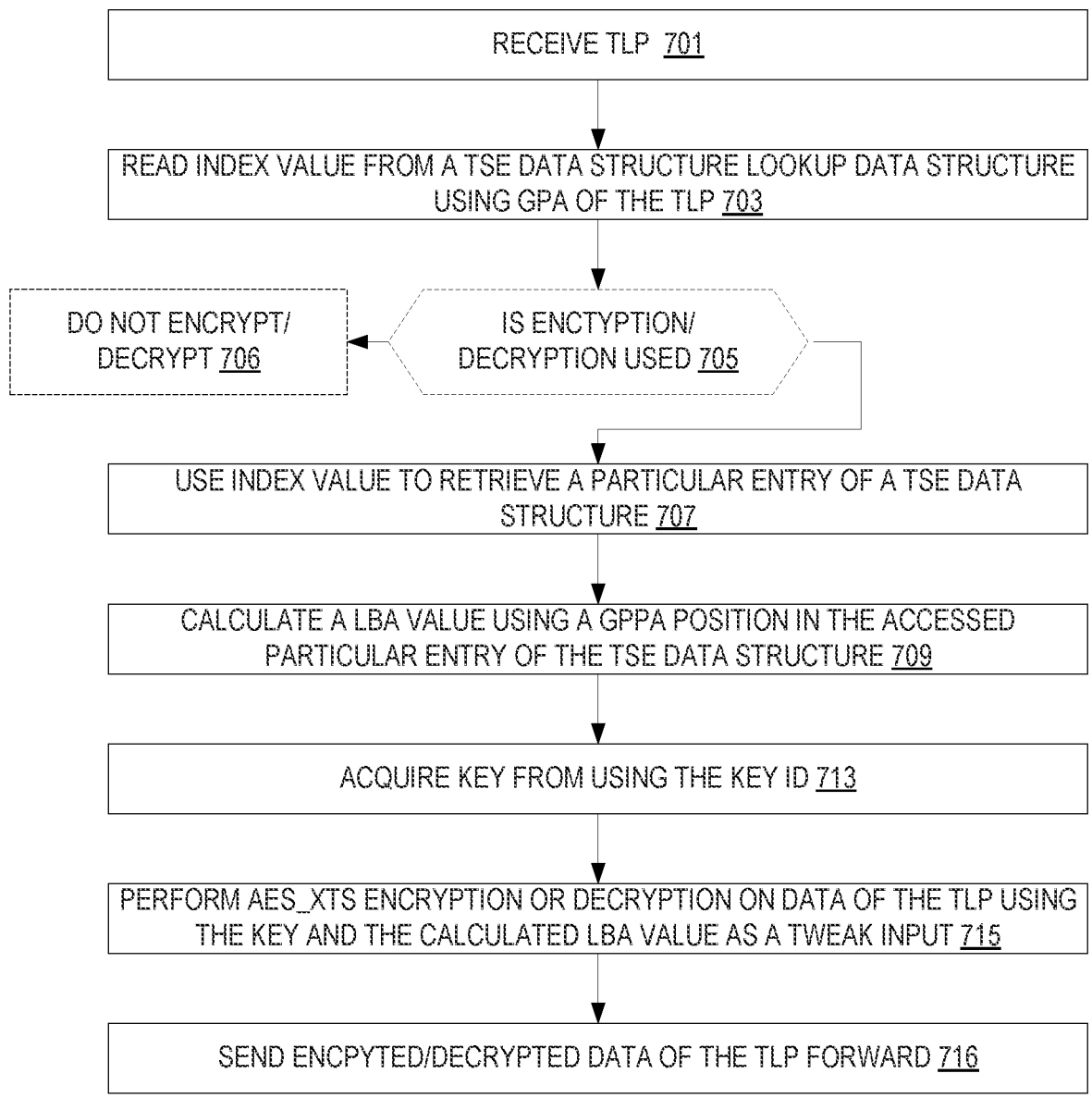
FIG. 7 illustrates embodiments of a method performed by a crypto controller or encryption data structure engine to perform DRAM assisted incline encryption or decryption.

FIG. 7 illustrates embodiments of a method performed by a crypto controller 322 or encryption data structure engine 610 to perform DRAM assisted incline encryption or decryption. At 701 a TLP is received. The TLP includes data to encrypt, a PRP GPA, etc.

An index value is read from an encryption data structure lookup data structure entry using the GPA of the TLP at 703. With respect to FIG. 6, the encryption data structure lookup data structure 232 is accessed to get an index value for the encryption data structure 230.

In some embodiments, a determination of if encryption or decryption is to be used is made at 705. For example, the orchestrator 616 may make this decision. In some embodiments, when the index bits are all zero, then encryption/decryption is not used. When encryption/decryption is not used, then the data from the TLP is not encrypted/decrypted and is sent off to storge, a device (such as a CPU core, etc.), etc.

When encryption/decryption is used, the index value is used to retrieve a particular entry of an encryption data structure (e.g., the encryption data structure 230) at 707. The entry is returned an includes a base LBA, a key ID, and one or more GPPAs.

A LBA value is calculated using a GPPA position in the accessed particular entry of the encryption data structure at 709. The GPPA position to use is the GPPA value identified in the indexed encryption data structure lookup data structure entry.

In some embodiments, when the block size is 4 KB, the GPPA position is multiplied by the block size to generate an intermediate result and the LBA value is that intermediate result added to the base LBA. Note that 4 KB is illustrative and the block size is configurable in some examples. In some embodiments, when the block size is 512b, the GPPA position is multiplied by the block size*8 to generate an intermediate result. An offset is calculated by taking the GPA of the TLP and ANDing with 0XFFFF and then shifting that result by 7 (e.g., GPA&0xFFFF)>>7. The LBA is offset multiplied by 512 with the intermediate result added (e.g., (intermediate result)+(offset*512)).

The key ID is used to acquire a key at 713 and AES_XTS encryption or decryption is performed on data of the TLP using the key and the calculated LBA value as a tweak input at 715.

The encrypted or decrypted data is forwarded at 717.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 8:
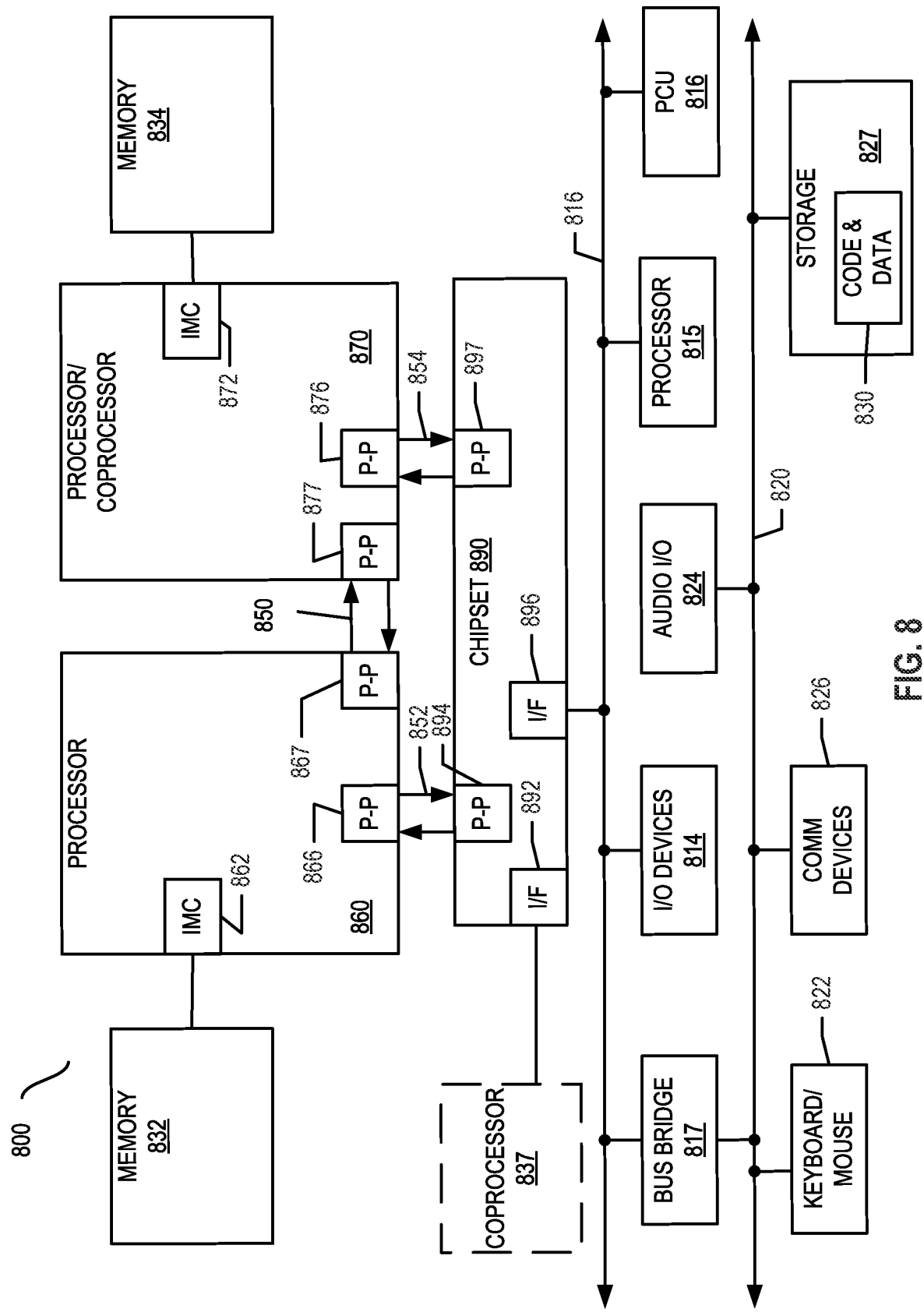
FIG. 8 illustrates embodiments of an exemplary system.

FIG. 8 illustrates embodiments of an exemplary system. Multiprocessor system 800 is a point-to-point interconnect system and includes a plurality of processors including a first processor 870 and a second processor 880 coupled via a point-to-point interconnect 850. In some embodiments, the first processor 870 and the second processor 880 are homogeneous. In some embodiments, first processor 870 and the second processor 880 are heterogenous.

Processors 870 and 880 are shown including integrated memory controller (IMC) units circuitry 872 and 882, respectively. Processor 870 also includes as part of its interconnect controller units point-to-point (P-P) interfaces 876 and 878; similarly, second processor 880 includes P-P interfaces 886 and 888. Processors 870, 880 may exchange information via the point-to-point (P-P) interconnect 850 using P-P interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a chipset 890 via individual P-P interconnects 852, 854 using point to point interface circuits 876, 894, 886, 898. Chipset 890 may optionally exchange information with a coprocessor 838 via a high-performance interface 892. In some embodiments, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor 870, 880 or outside of both processors, yet connected with the processors via P-P interconnect, such that either or both processors' local cache information may be stored in the shared cache if a processor is placed into a low power mode.

Chipset 890 may be coupled to a first interconnect 816 via an interface 896. In some embodiments, first interconnect 816 may be a Peripheral Component Interconnect (PCI) interconnect, or an interconnect such as a PCI Express interconnect or another I/O interconnect. In some embodiments, one of the interconnects couples to a power control unit (PCU) 817, which may include circuitry, software, and/or firmware to perform power management operations with regard to the processors 870, 880 and/or co-processor 838. PCU 817 provides control information to a voltage regulator to cause the voltage regulator to generate the appropriate regulated voltage. PCU 817 also provides control information to control the operating voltage generated. In various embodiments, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other embodiments, power management operations to be performed by PCU 817 may be implemented externally to a processor, such as by way of a separate power management integrated circuit (PM IC) or another component external to the processor. In yet other embodiments, power management operations to be performed by PCU 817 may be implemented within BIOS or other system software.

Various I/O devices 814 may be coupled to first interconnect 816, along with an interconnect (bus) bridge 818 which couples first interconnect 816 to a second interconnect 820. In some embodiments, one or more additional processor(s) 815, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 816. In some embodiments, second interconnect 820 may be a low pin count (LPC) interconnect. Various devices may be coupled to second interconnect 820 including, for example, a keyboard and/or mouse 822, communication devices 827 and a storage unit circuitry 828. Storage unit circuitry 828 may be a disk drive or other mass storage device which may include instructions/code and data 830, in some embodiments. Further, an audio I/O 824 may be coupled to second interconnect 820. Note that other architectures than the point-to-point architecture described above are possible. For example, instead of the point-to-point architecture, a system such as multiprocessor system 800 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 9:
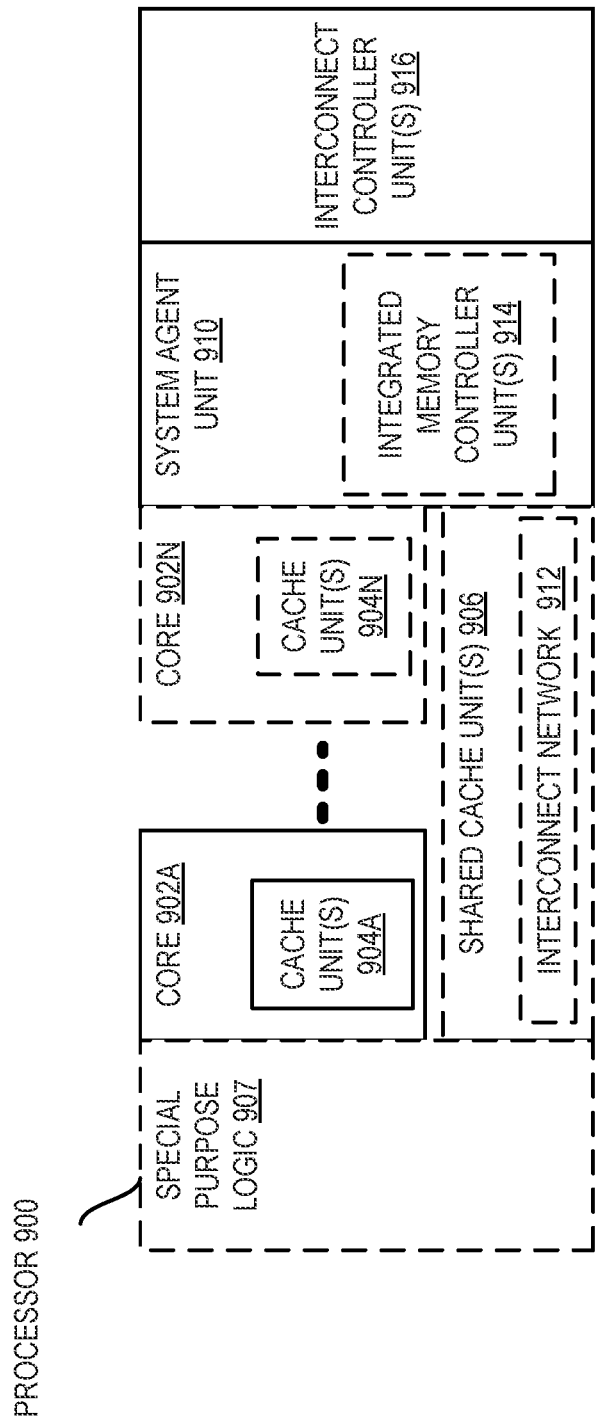
FIG. 9 illustrates a block diagram of embodiments of a processor that may have more than one core, may have an integrated memory controller, and may have integrated graphics.

FIG. 9 illustrates a block diagram of embodiments of a processor 900 that may have more than one core, may have an integrated memory controller, and may have integrated graphics. The solid lined boxes illustrate a processor 900 with a single core 902A, a system agent 910, a set of one or more interconnect controller units circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interconnect controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

A memory hierarchy includes one or more levels of cache unit(s) circuitry 904(A)-(N) within the cores 902(A)-(N), a set of one or more shared cache units circuitry 906, and external memory (not shown) coupled to the set of integrated memory controller units circuitry 914. The set of one or more shared cache units circuitry 906 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 912 interconnects the special purpose logic 908 (e.g., integrated graphics logic), the set of shared cache units circuitry 906, and the system agent unit circuitry 910, alternative embodiments use any number of well-known techniques for interconnecting such units. In some embodiments, coherency is maintained between one or more of the shared cache units circuitry 906 and cores 902(A)-(N).

In some embodiments, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous or heterogeneous in terms of architecture instruction set; that is, two or more of the cores 902(A)-(N) may be capable of executing the same instruction set, while other cores may be capable of executing only a subset of that instruction set or a different instruction set.

Exemplary Core Architectures

In-Order and Out-Of-Order Core Block Diagram

Figure 10A:
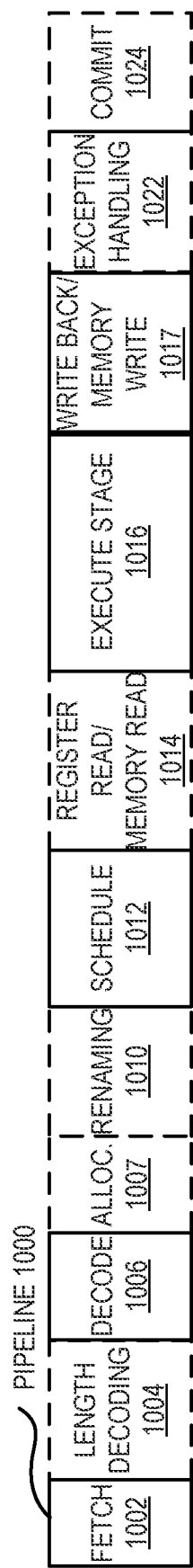
FIG. 10(A) is a block diagram illustrating both an exemplary in-order pipeline and an exemplary register renaming, out-of-order issue/execution pipeline according to embodiments of the invention.
Figure 10B:
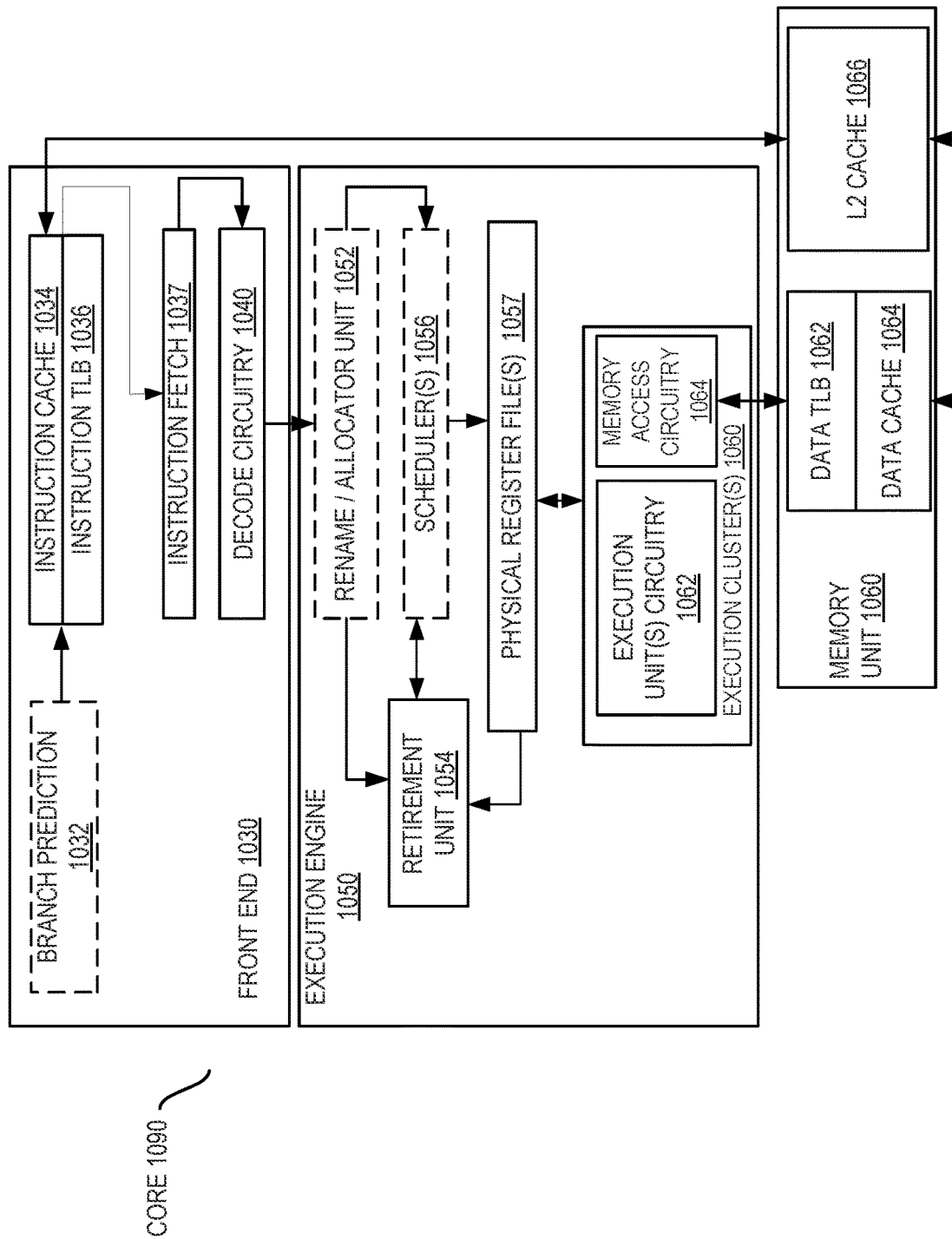
FIG. 10(B) is a block diagram illustrating both an exemplary embodiment of an in-order architecture core and an exemplary register renaming, out-of-order issue/execution architecture core to be included in a processor according to embodiments of the invention.

FIG. 10(A) is a block diagram illustrating both an exemplary in-order pipeline and an exemplary register renaming, out-of-order issue/execution pipeline according to embodiments of the invention. FIG. 10(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 10(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10(A), a processor pipeline 1000 includes a fetch stage 1002, an optional length decode stage 1004, a decode stage 1006, an optional allocation stage 1008, an optional renaming stage 1010, a scheduling (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages.

For example, during the fetch stage 1002, one or more instructions are fetched from instruction memory, during the decode stage 1006, the one or more fetched instructions may be decoded, addresses (e.g., load store unit (LSU) addresses) using forwarded register ports may be generated, and branch forwarding (e.g., immediate offset or an link register (LR)) may be performed. In one or more examples, the decode stage 1006 and the register read/memory read stage 1014 may be combined into one pipeline stage. In one or more examples, during the execute stage 1016, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit circuitry 1040 performs the decode stage 1006; 3) the rename/allocator unit circuitry 1052 performs the allocation stage 1008 and renaming stage 1010; 4) the scheduler unit(s) circuitry 1056 performs the schedule stage 1012; 5) the physical register file(s) unit(s) circuitry 1058 and the memory unit circuitry 1070 perform the register read/memory read stage 1014; the execution cluster 1060 perform the execute stage 1016; 6) the memory unit circuitry 1070 and the physical register file(s) unit(s) circuitry 1058 perform the write back/memory write stage 1018; 7) various units (unit circuitry) may be involved in the exception handling stage 1022; and 8) the retirement unit circuitry 1054 and the physical register file(s) unit(s) circuitry 1058 perform the commit stage 1024.

FIG. 10(B) shows processor core 1090 including front-end unit circuitry 1030 coupled to an execution engine unit circuitry 1050, and both are coupled to a memory unit circuitry 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction unit circuitry 1032 coupled to an instruction cache unit circuitry 1034, which is coupled to an instruction translation lookaside buffer (TLB) 1036, which is coupled to instruction fetch unit circuitry 1038, which is coupled to decode unit circuitry 1040. In one or more examples, the instruction cache unit circuitry 1034 is included in the memory unit circuitry 1070 rather than the front-end unit circuitry 1030. The decode unit circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1040 may further include an address generation unit circuitry (AGU, not shown). In one or more examples, the AGU generates an LSU address using forwarded register ports, and may further perform branch forwarding (e.g., immediate offset branch forwarding, LR register branch forwarding, etc.). The decode unit circuitry 1040 may be implemented using various different mechanisms. Examples of suitable mechanisms include, but are not limited to, look-up tables, hardware implementations, programmable logic arrays (PLAs), microcode read only memories (ROMs), etc. In one or more examples, the core 1090 includes a microcode ROM (not shown) or other medium that stores microcode for certain macroinstructions (e.g., in decode unit circuitry 1040 or otherwise within the front end unit circuitry 1030). In one or more examples, the decode unit circuitry 1040 includes a micro-operation (micro-op) or operation cache (not shown) to hold/cache decoded operations, micro-tags, or micro-operations generated during the decode or other stages of the processor pipeline 1000. The decode unit circuitry 1040 may be coupled to rename/allocator unit circuitry 1052 in the execution engine unit circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some embodiments, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one or more examples, the physical register file(s) unit circuitry 1058 includes vector registers unit circuitry, writemask registers unit circuitry, and scalar register unit circuitry. These register units may provide architectural vector registers, vector mask registers, general-purpose registers, etc. The physical register file(s) unit(s) circuitry 1058 is overlapped by the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution units circuitry 1062 and a set of one or more memory access circuitry 1064. The execution units circuitry 1062 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1056, physical register file(s) unit(s) circuitry 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s)

unit circuitry, and/or execution cluster—and in the case of a separate memory access pipeline, certain embodiments are implemented in which only the execution cluster of this pipeline has the memory access unit(s) circuitry 1064). It should also be understood that where separate pipelines are used, one or more of these pipelines may be out-of-order issue/execution and the rest in-order.

In some embodiments, the execution engine unit circuitry 1050 may perform load store unit (LSU) address/data pipelining to an Advanced Microcontroller Bus (AHB) interface (not shown), and address phase and writeback, data phase load, store, and branches.

The set of memory access circuitry 1064 is coupled to the memory unit circuitry 1070, which includes data TLB unit circuitry 1072 coupled to a data cache circuitry 1074 coupled to a level 2 (L2) cache circuitry 1076. In one exemplary embodiment, the memory access units circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to a level 2 (L2) cache unit circuitry 1076 in the memory unit circuitry 1070. In one or more examples, the instruction cache 1034 and the data cache 1074 are combined into a single instruction and data cache (not shown) in L2 cache unit circuitry 1076, a level 3 (L3) cache unit circuitry (not shown), and/or main memory. The L2 cache unit circuitry 1076 is coupled to one or more other levels of cache and eventually to a main memory.

The core 1090 may support one or more instructions sets (e.g., the x86 instruction set (with some extensions that have been added with newer versions); the MIPS instruction set; the ARM instruction set (with optional additional extensions such as NEON)), including the instruction(s) described herein. In one or more examples, the core 1090 includes logic to support a packed data instruction set extension (e.g., AVX1, AVX2), thereby allowing the operations used by many multimedia applications to be performed using packed data.

Exemplary Execution Unit(s) Circuitry

Figure 11:
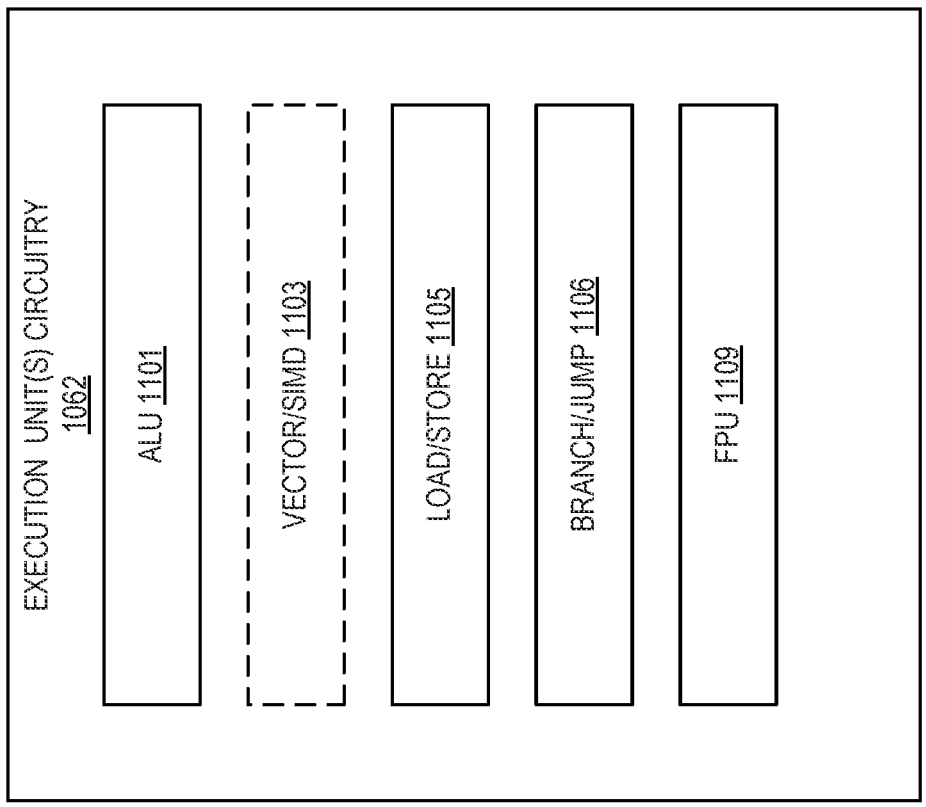
FIG. 11 illustrates embodiments of execution unit(s) circuitry, such as execution unit(s) circuitry of FIG. 10(B).

FIG. 11 illustrates embodiments of execution unit(s) circuitry, such as execution unit(s) circuitry 1062 of FIG. 10(B). As illustrated, execution unit(s) circuity 1062 may include one or more ALU circuits 1101, vector/SIMD unit circuits 1103, load/store unit circuits 1105, and/or branch/jump unit circuits 1107. ALU circuits 1101 perform integer arithmetic and/or Boolean operations. Vector/SIMD unit circuits 1103 perform vector/SIMD operations on packed data (such as SIMD/vector registers). Load/store unit circuits 1105 execute load and store instructions to load data from memory into registers or store from registers to memory. Load/store unit circuits 1105 may also generate addresses. Branch/jump unit circuits 1107 cause a branch or jump to a memory address depending on the instruction. Floating-point unit (FPU) circuits 1109 perform floating-point arithmetic. The width of the execution unit(s) circuitry 1062 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 12:
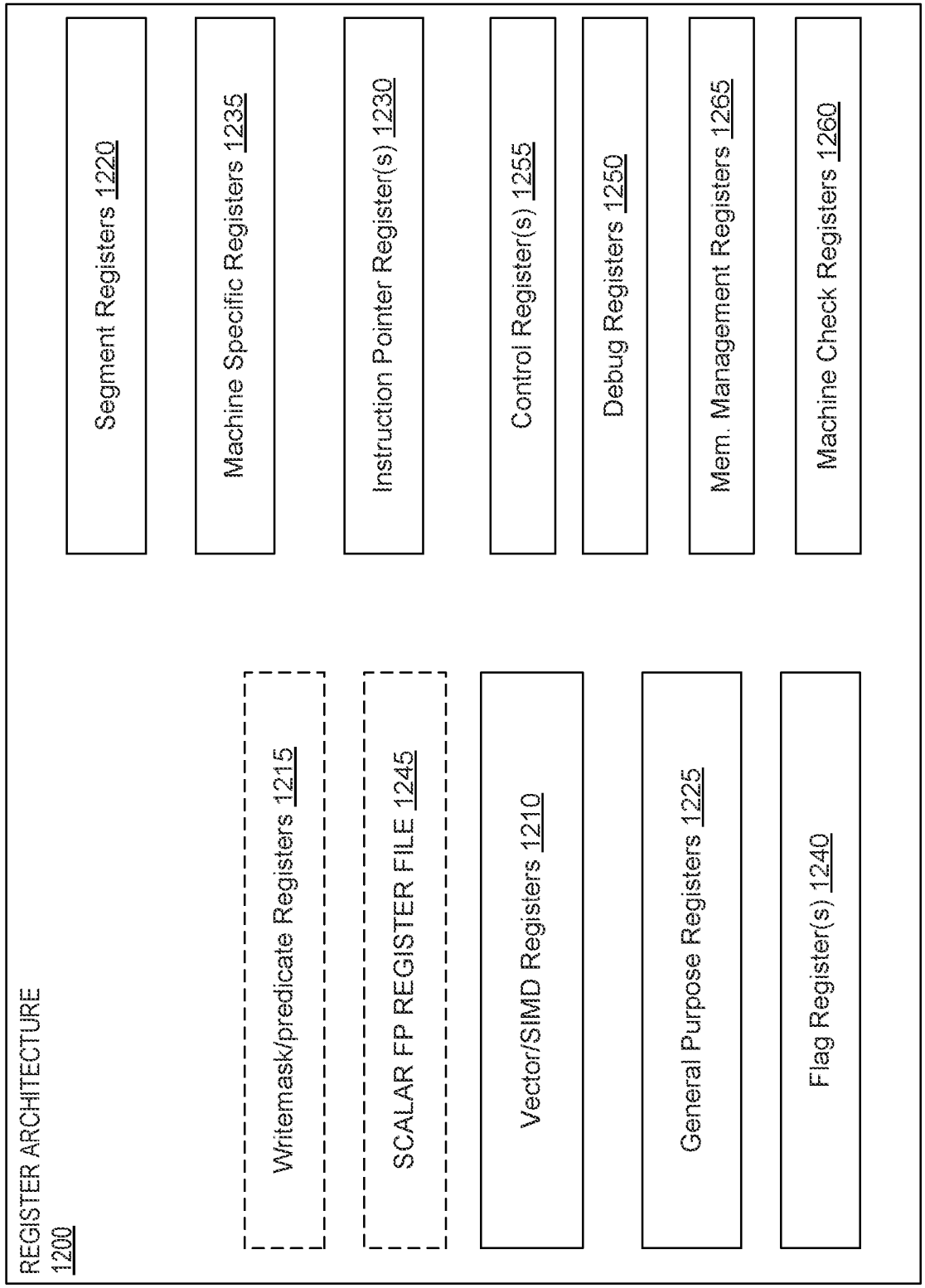
FIG. 12 is a block diagram of a register architecture according to some embodiments.

FIG. 12 is a block diagram of a register architecture 1200 according to some embodiments. As illustrated, there are vector/SIMD registers 1210 that vary from 128-bit to 1,024 bits width. In some embodiments, the vector/SIMD registers 1210 are physically 512-bits and, depending upon the mapping, only some of the lower bits are used. For example, in some embodiments, the vector/SIMD registers 1210 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1200 includes writemask/predicate registers 1215. For example, in some embodiments, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1215 corresponds to a data element position of the destination. In other embodiments, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1200 includes scalar floating-point register 1245 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some embodiments, the one or more flag registers 1240 are called program status and control registers.

Segment registers 1220 contain segment points for use in accessing memory. In some embodiments, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory management registers 1265 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 13:
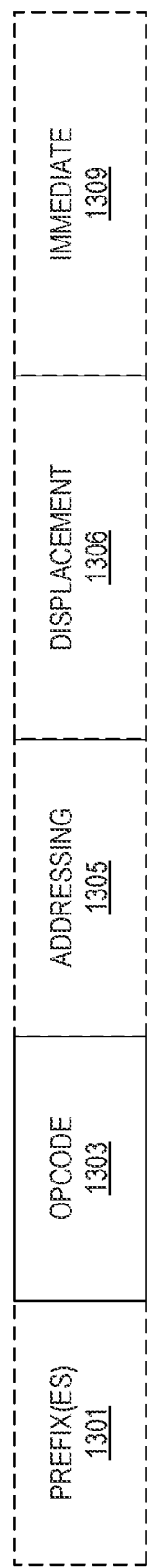
FIG. 13 illustrates embodiments of an instruction format.

FIG. 13 illustrates embodiments of an instruction format. As illustrated, an instruction may include multiple components including, but not limited to, one or more fields for: one or more prefixes 1301, an opcode 1303, addressing information 1305 (e.g., register identifiers, memory addressing information, etc.), a displacement value 1307, and/or an immediate 1309. Note that some instructions utilize some or all of the fields of the format whereas others may only use the field for the opcode 1303. In some embodiments, the order illustrated is the order in which these fields are to be encoded, however, it should be appreciated that in other embodiments these fields may be encoded in a different order, combined, etc.

The prefix(es) field(s) 1301, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some embodiments, a primary opcode encoded in the opcode field 1303 is 1, 2, or 3 bytes in length. In other embodiments, a primary opcode can be a different length. An additional 3-bit opcode field is sometimes encoded in another field.

Figure 14:
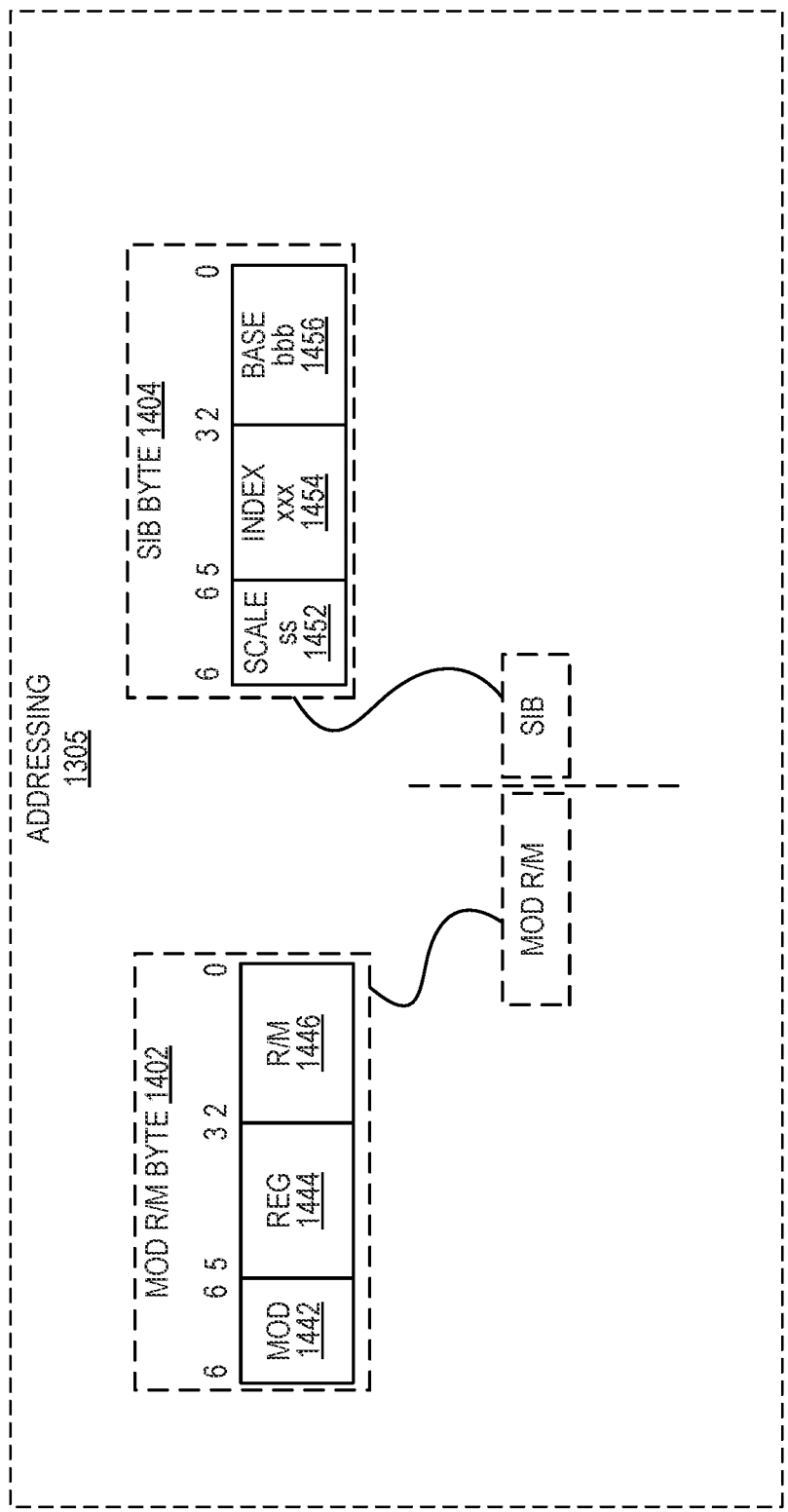
FIG. 14 illustrates embodiments of an addressing field.

The addressing field 1305 is used to address one or more operands of the instruction, such as a location in memory or one or more registers. FIG. 14 illustrates embodiments of the addressing field 1305. In this illustration, an optional Mod R/M byte 1402 and an optional Scale, Index, Base (SIB) byte 1404 are shown. The Mod R/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register field 1444, and R/M field 1446.

The content of the MOD field 1442 distinguishes between memory access and non-memory access modes. In some embodiments, when the MOD field 1442 has a value of b11, a register-direct addressing mode is utilized, and otherwise register-indirect addressing is used.

The register field 1444 may encode either the destination register operand or a source register operand, or may encode an opcode extension and not be used to encode any instruction operand. The content of register index field 1444, directly or through address generation, specifies the locations of a source or destination operand (either in a register or in memory). In some embodiments, the register field 1444 is supplemented with an additional bit from a prefix (e.g., prefix 1301) to allow for greater addressing.

The R/M field 1446 may be used to encode an instruction operand that references a memory address, or may be used to encode either the destination register operand or a source register operand. Note the R/M field 1446 may be combined with the MOD field 1442 to dictate an addressing mode in some embodiments.

The SIB byte 1404 includes a scale field 1452, an index field 1454, and a base field 1456 to be used in the generation of an address. The scale field 1452 indicates scaling factor. The index field 1454 specifies an index register to use. In some embodiments, the index field 1454 is supplemented with an additional bit from a prefix (e.g., prefix 1301) to allow for greater addressing. The base field 1456 specifies a base register to use. In some embodiments, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1307 provides this value. Additionally, in some embodiments, a displacement factor usage is encoded in the MOD field of the addressing field 1305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1307.

In some embodiments, an immediate field 1309 specifies an immediate for the instruction. An immediate may be encoded as a 1-byte value, a 2-byte value, a 4-byte value, etc.

FIG. 15 illustrates embodiments of a first prefix 1301(A). In some embodiments, the first prefix 1301(A) is an example of a REX prefix. Instructions that use this prefix may specify general purpose registers, 64-bit packed data registers (e.g., single instruction, multiple data (SIM D) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may an extension of the MOD R/M reg field 1444 and may be used to modify the Mod R/M reg field 1444 when that field encodes a general purpose register, a 64-bit packed data register (e.g., a SSE register), or a control or debug register. R is ignored when Mod R/M byte 1402 specifies other registers or defines an extended opcode.

Bit position 1 (X) X bit may modify the SIB byte index field 1454.

Bit position B (B) B may modify the base in the Mod R/M R/M field 1446 or the SIB byte base field 1456; or it may modify the opcode register field used for accessing general purpose registers (e.g., general purpose registers 1225).

FIGS. 16(A)-(D) illustrate embodiments of how the R, X, and B fields of the first prefix 1301(A) are used. FIG. 16(A) illustrates R and B from the first prefix 1301(A) being used to extend the reg field 1444 and R/M field 1446 of the MOD R/M byte 1402 when the SIB byte 14 04 is not used for memory addressing. FIG. 16(B) illustrates R and B from the first prefix 1301(A) being used to extend the reg field 1444 and R/M field 1446 of the MOD R/M byte 1402 when the SIB byte 14 04 is not used (register-register addressing). FIG. 16(C) illustrates R, X, and B from the first prefix 1301(A) being used to extend the reg field 1444 of the MOD R/M byte 1402 and the index field 1454 and base field 1456 when the SIB byte 14 04 being used for memory addressing. FIG. 16(D) illustrates B from the first prefix 1301(A) being used to extend the reg field 1444 of the MOD R/M byte 1402 when a register is encoded in the opcode 1303.

Figure 17A:
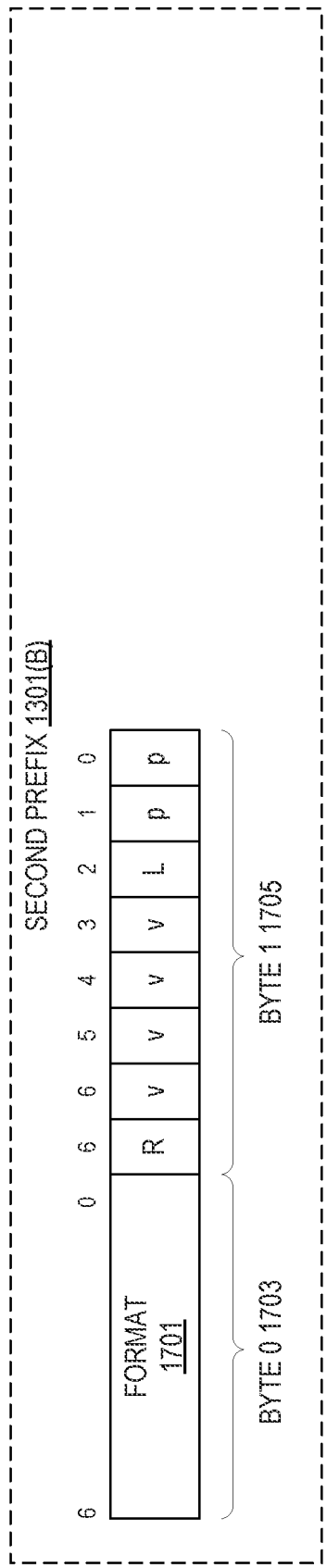
FIGS. 17(A)-(B) illustrate embodiments of a second prefix.
Figure 17B:
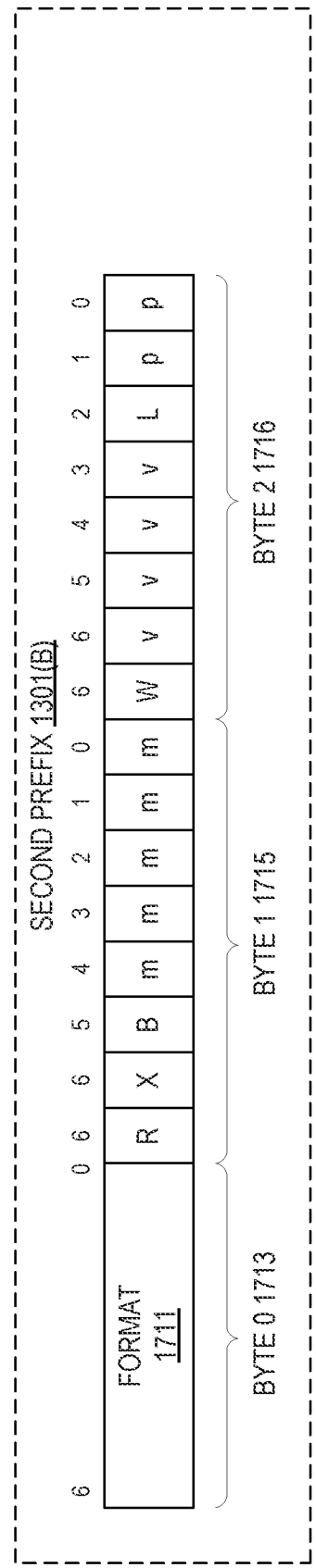

FIGS. 17(A)-(B) illustrate embodiments of a second prefix 1301(B). In some embodiments, the second prefix 1301(B) is an example of a VEX prefix. The second prefix 1301(B) encoding allows instructions to have more than two operands, and allows SIMD vector registers (e.g., vector/SIMD registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some embodiments, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17(A) illustrates embodiments of a two-byte form of the second prefix 1301(B). In one example, a format field 1701 (byte 0 1703) contains the value C5H. In one example, byte 1 1705 includes a "R" value in bit[7]. This value is the complement of the same value of the first prefix 1301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446 and the Mod R/M reg field 1444 encode three of the four operands. Bits[7:4] of the immediate 1309 are then used to encode the third source register operand.

FIG. 17(B) illustrates embodiments of a three-byte form of the second prefix 1301(B). in one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

Figure 18:
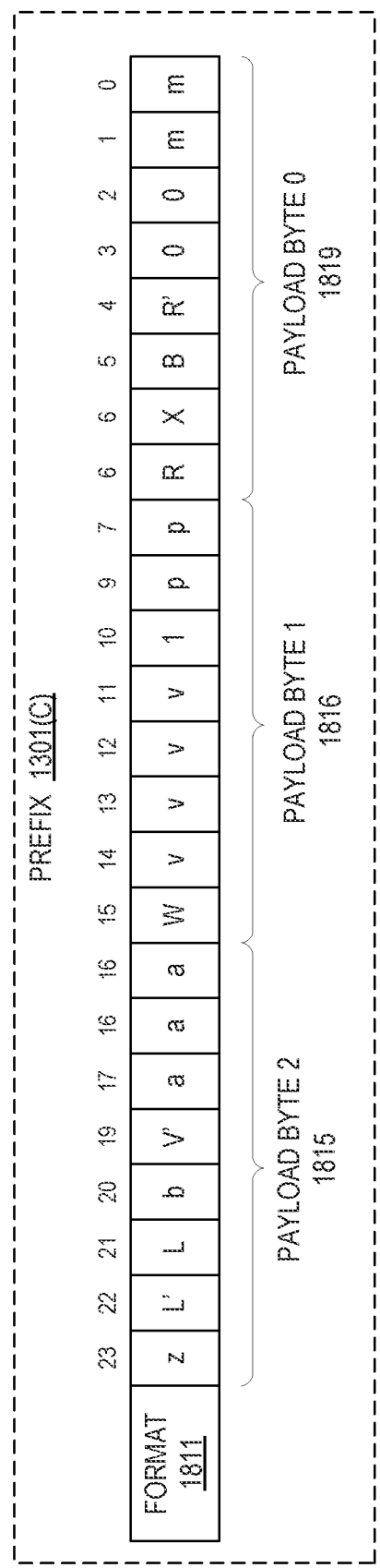
FIG. 18 illustrates embodiments of a third prefix.

FIG. 18 illustrates embodiments of a third prefix 1301(C). In some embodiments, the first prefix 1301(A) is an example of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 62H. Subsequent bytes are referred to as payload bytes 1815-1819 and collectively form a 24-bit value of P[23:0] providing specific capability in the form of one or more fields (detailed herein).

In some embodiments, P[1:0] of payload byte 1819 are identical to the low two mmmmm bits. P[3:2] are reserved in some embodiments. Bit P[4] (R') allows access to the high 16 vector register set when combined with P[7] and the Mod R/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the Mod R/M register field 1444 and Mod R/M R/M field 1446. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1301(A) and second prefix 1311(B) and may serve as an opcode extension bit or operand size promotion.

P[18:16] specify the index of a register in the opmask (writemask) registers (e.g., writemask/predicate registers 1215). In one or more examples of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one or more examples, preserving the old value of each element of the destination where the corresponding mask bit has a 0. In contrast, when zeroing vector masks allow any set of elements in the destination to be zeroed during the execution of any operation (specified by the base operation and the augmentation operation); in one or more examples, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1301(C) are detailed in the following tables.

TABLE 1

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB. index | GPR | Memory addressing |
| VIDX | V' | X | SIB. index | Vector | VSIB memory addressing |

TABLE 2

Encoding Register Specifiers in 32-bit Mode

|  | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB. index | GPR | Memory addressing |
| VIDX | SIB. index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {kl} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one or more examples may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
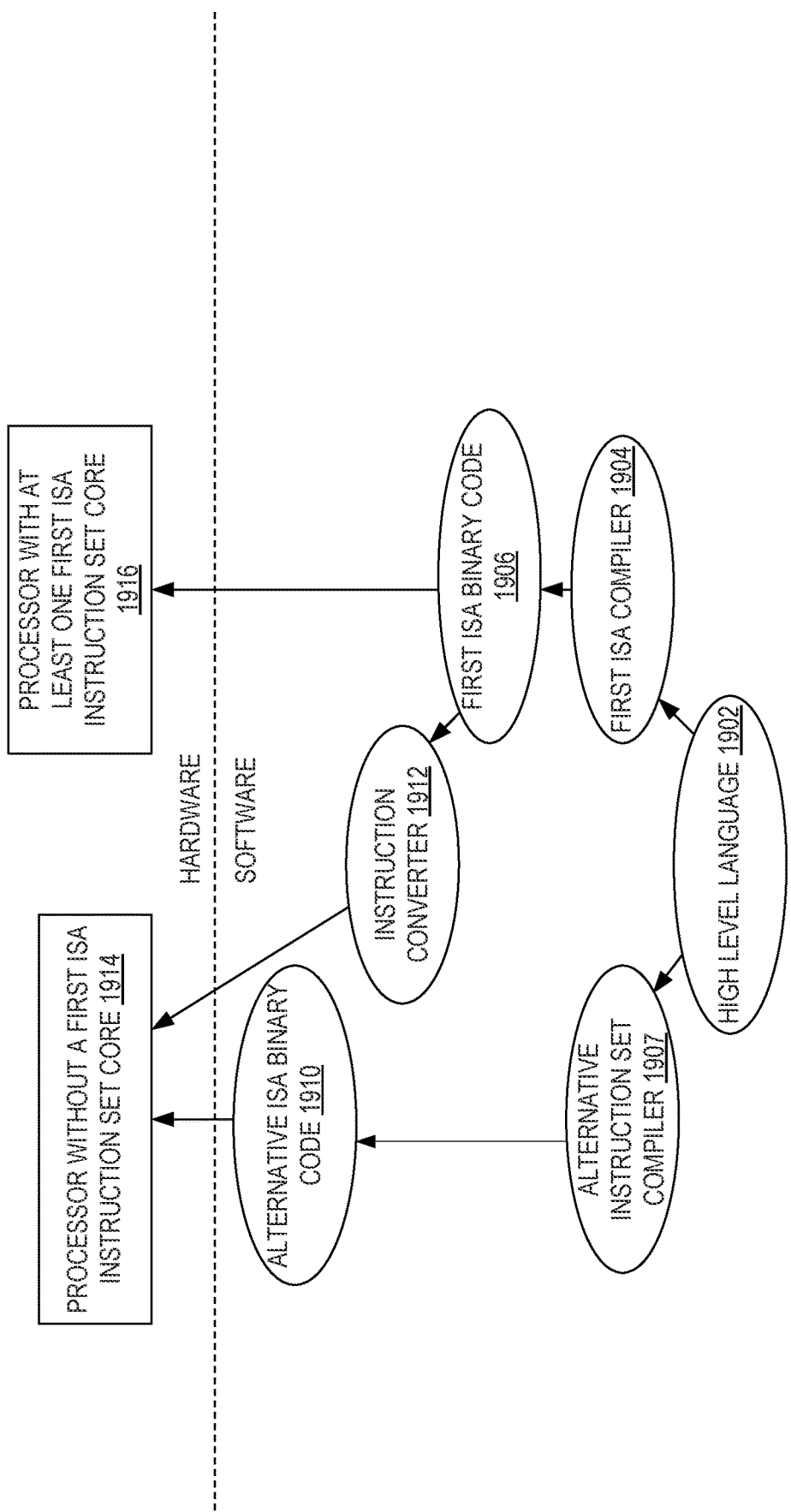
FIG. 19 illustrates a block diagram contrasting the use of a software instruction converter to convert binary instructions in a source instruction set to binary instructions in a target instruction set according to embodiments of the invention.

FIG. 19 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set core 1916. The processor with at least one first ISA instruction set core 1916 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1904 represents a compiler that is operable to generate first ISA binary code 1906 (e.g., object code) that can, with or without additional linkage processing, be executed on the processor with at least one first ISA instruction set core 1916. Similarly, FIG. 19 shows the program in the high-level language 1902 may be compiled using an alternative instruction set compiler 1908 to generate alternative instruction set binary code 1910 that may be natively executed by a processor without a first ISA instruction set core 1914. The instruction converter 1912 is used to convert the first ISA binary code 1906 into code that may be natively executed by the processor without a first ISA instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have a first ISA instruction set processor or core to execute the first ISA binary code 1906.

References to "one or more examples," "an example," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example, it is submitted that it is within the knowledge of one skilled in the art to affect such feature, structure, or characteristic in connection with other embodiments whether or not explicitly described.

Examples include, but are not limited to:

1. An apparatus comprising:
    an encryption/decryption engine to encrypt or decrypt data; and
    an encryption data structure engine to provide a key, data, and a tweak to the encryption/decryption engine, wherein the encryption data structure engine is to:
        read an index value from an encryption data structure lookup data structure entry using an address, the entry to include the index value and a guest page physical address (GPPA),
        retrieve, based on the index value, an entry from an encryption data structure, the entry to include a logical block address (LBA) base, a key identifier, and at least one GPPA in a sequence of GPPAs,
        generate a LBA using a position of the GPPA from the encryption data structure lookup data structure entry in the sequence of GPPAs, and
        retrieve a key based on the key identifier, wherein the encryption/decryption engine to encrypt or decrypt data using the retrieved key, and the generated LBA.
2. The apparatus of example 1, wherein the address is a guest physical address.
3. The apparatus of example 2, wherein the guest physical address is a part of a transport layer packet.
4. The apparatus of any of examples 1-3, wherein the GPPA position is multiplied by the block size to generate an intermediate result and the LBA value is that intermediate result added to the LBA base.
5. The apparatus of any of examples 1-3, when the block size is 512b, the GPPA position is multiplied by the block size*8 to generate an intermediate result, an offset is calculated by taking the address and ANDing with 0XFFFF and then shifting by 7, and the LBA is the offset multiplied by 512 with the intermediate result added.
6. The apparatus of any of examples 1-5, wherein the encryption is AES_XTS.
7. The apparatus of any of examples 1-5, wherein the decryption is AES_XTS.
8. A system comprising:
    dynamic random access memory to store am the encryption data structure;
    an encryption engine to encrypt data; and
    an encryption data structure engine to provide a key, data, and a tweak to the encryption/decryption engine, wherein the encryption data structure engine is to:
        read an index value from an encryption data structure lookup data structure entry using an address, the entry to include the index value and a guest page physical address (GPPA),
        retrieve, based on the index value, an entry from the encryption data structure, the entry to include a logical block address (LBA) base, a key identifier, and at least one GPPA in a sequence of GPPAs,
        generate a LBA using a position of the GPPA from the encryption data structure lookup data structure entry in the sequence of GPPAs, and
        retrieve a key based on the key identifier, wherein the encryption engine to encrypt data using the retrieved key, and the generated LBA.
9. The system of example 8, wherein the address is a guest physical address.
10. The apparatus of example 9, wherein the guest physical address is a part of a transport layer packet.
11. The system of any of examples 8-10, wherein when the block size is 4 KB, the GPPA position is multiplied by the block size to generate an intermediate result and the LBA value is that intermediate result added to the LBA base.
12. The system of any of examples 8-10, when the block size is 512b, the GPPA position is multiplied by the block size*8 to generate an intermediate result, an offset is calculated by taking the address and ANDing with 0XFFFF and then shifting by 7, and the LBA is the offset multiplied by 512 with the intermediate result added.
13. The system of any of examples 8-12, wherein the encryption is AES_XTS.
14. A method comprising:
    read an index value from an encryption data structure lookup data structure entry using an address, the entry to include the index value and a guest page physical address (GPPA);
    retrieve, based on the index value, an entry from an encryption data structure, the entry to include a logical block address (LBA) base, a key identifier, and at least one GPPA in a sequence of GPPAs;
    generate a LBA using a position of the GPPA from the encryption data structure lookup data structure entry in the sequence of GPPAs; and
    retrieve a key based on the key identifier, wherein the encryption/decryption engine to encrypt or decrypt data using the retrieved key, and the generated LBA;
    encrypting or decrypting the data.
15. The method of example 14, wherein the address is a guest physical address.
16. The method of example 15, wherein the guest physical address is a part of a transport layer packet.
17. The method of any of examples 14-16, wherein the GPPA position is multiplied by the block size to generate an intermediate result and the LBA value is that intermediate result added to the LBA base.
18. The method of any of examples 14-16, when the block size is 512b, the GPPA position is multiplied by the block size*8 to generate an intermediate result, an offset is calculated by taking the address and ANDing with 0XFFFF and then shifting by 7, and the LBA is the offset multiplied by 512 with the intermediate result added.
19. The method of any of examples 14-18, wherein the encryption is AES_XTS.
20. The method of any of examples 14-18, wherein the decryption is AES_XTS.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
    an encryption/decryption engine circuitry to encrypt or decrypt data; and an encryption data structure engine circuitry to provide a key, data, and a tweak to the encryption/decryption engine circuitry, wherein the encryption data structure engine circuitry is to:
   read an index value from an encryption data structure lookup data structure entry using an address, wherein the address is a guest physical address, the encryption data structure lookup data structure entry to include the index value and a guest page physical address (GPPA),
   retrieve, based on the index value, an entry from an encryption data structure, the entry to include a logical block address (LBA) base, a key identifier, and at least one GPPA in a sequence of GPPAs,
   generate a LBA using a position of the GPPA from the encryption data structure lookup data structure entry in the sequence of GPPAs, and
   retrieve a key based on the key identifier, wherein the encryption/decryption engine to encrypt or decrypt data using the retrieved key, and the generated LBA.

2. The apparatus of claim 1, wherein the guest physical address is a part of a transport layer packet.

3. The apparatus of claim 1, wherein the GPPA position is multiplied by the block size to generate an intermediate result and the LBA value is that intermediate result added to the LBA base.

4. The apparatus of claim 1, when the block size is 512b, the GPPA position is multiplied by the block size*8 to generate an intermediate result, an offset is calculated by taking the address and ANDing with 0XFFFF and then shifting by 7, and the LBA is the offset multiplied by 512 with the intermediate result added.

5. The apparatus of claim 1, wherein the encryption is AES_XTS.

6. The apparatus of claim 1, wherein the decryption is AES_XTS.

7. A system comprising:
   dynamic random access memory to store an encryption data structure;
   an encryption engine to encrypt data; and
   an encryption data structure engine to provide a key, data, and a tweak to the encryption engine, wherein the encryption data structure engine is to:
      read an index value from an encryption data structure lookup data structure entry using an address, wherein the address is a guest physical address, the encryption data structure lookup data structure entry to include the index value and a guest page physical address (GPPA),
      retrieve, based on the index value, an entry from the encryption data structure, the entry to include a logical block address (LBA) base, a key identifier, and at least one GPPA in a sequence of GPPAs,
      generate a LBA using a position of the GPPA from the encryption data structure lookup data structure entry in the sequence of GPPAs, and
      retrieve a key based on the key identifier, wherein the encryption engine to encrypt data using the retrieved key, and the generated LBA.

8. The apparatus of claim 7, wherein the guest physical address is a part of a transport layer packet.

9. The system of claim 7, wherein when the block size is 4 KB, the GPPA position is multiplied by the block size to generate an intermediate result and the LBA value is that intermediate result added to the LBA base.

10. The system of claim 7, when the block size is 512b, the GPPA position is multiplied by the block size*8 to generate an intermediate result, an offset is calculated by taking the address and ANDing with 0XFFFF and then shifting by 7, and the LBA is the offset multiplied by 512 with the intermediate result added.

11. The system of claim 7, wherein the encryption is AES_XTS.

12. A method comprising:
   read an index value from an encryption data structure lookup data structure entry using an address, wherein the address is a guest physical address, the encryption data structure lookup data structure entry to include the index value and a guest page physical address (GPPA);
   retrieve, based on the index value, an entry from an encryption data structure, the entry to include a logical block address (LBA) base, a key identifier, and at least one GPPA in a sequence of GPPAs;
   generate a LBA using a position of the GPPA from the encryption data structure lookup data structure entry in the sequence of GPPAs; and
   retrieve a key based on the key identifier, wherein the encryption/decryption engine to encrypt or decrypt data using the retrieved key, and the generated LBA;
   encrypting or decrypting the data.

13. The method of claim 12, wherein the guest physical address is a part of a transport layer packet.

14. The method of claim 12, wherein the GPPA position is multiplied by the block size to generate an intermediate result and the LBA value is that intermediate result added to the LBA base.

15. The method of claim 12, when the block size is 512b, the GPPA position is multiplied by the block size*8 to generate an intermediate result, an offset is calculated by taking the address and ANDing with 0XFFFF and then shifting by 7, and the LBA is the offset multiplied by 512 with the intermediate result added.

16. The method of claim 12, wherein the encryption is AES_XTS.

17. The method of claim 12, wherein the decryption is AES_XTS.

* * * * *